US011402676B2

(12) United States Patent
Fang et al.

(10) Patent No.: US 11,402,676 B2
(45) Date of Patent: Aug. 2, 2022

(54) VIEWING ANGLE SWITCHABLE DISPLAY APPARATUS

(71) Applicant: Coretronic Corporation, Hsin-Chu (TW)

(72) Inventors: Chung-Yang Fang, Hsin-Chu (TW); Wen-Chun Wang, Hsin-Chu (TW); Ping-Yen Chen, Hsin-Chu (TW); Hsiung-Chun Hsu, Hsin-Chu (TW); Chien-Hui Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/826,706

(22) Filed: Nov. 30, 2017

(65) Prior Publication Data

US 2018/0210243 A1    Jul. 26, 2018

(30) Foreign Application Priority Data

Jan. 25, 2017   (CN) .......................... 201710060681.4

(51) Int. Cl.
*G02F 1/13*       (2006.01)
*G02F 1/1335*   (2006.01)
(Continued)

(52) U.S. Cl.
CPC ......... *G02F 1/1323* (2013.01); *G02B 6/0038* (2013.01); *G02B 6/0053* (2013.01);
(Continued)

(58) Field of Classification Search
CPC ............. G02F 1/1323; G02F 1/133528; G02F 1/13363; G02F 1/13338; G02F 1/1334;
(Continued)

(56) References Cited

U.S. PATENT DOCUMENTS 4,688,900 A    8/1987   Doane et al.
5,301,046 A    4/1994   Konuma et al.
(Continued)

FOREIGN PATENT DOCUMENTS

CN    1702517    11/2005
CN    1708704    12/2005
(Continued)

OTHER PUBLICATIONS

Yuzo Histake, et al., "31.3: Viewing Angle Controllable LCD using Variable Optical Compensator and Variable Diffuser," SID International symposium digest of technical papers, vol. 36, Issue 1, May 2005, pp. 1218-1221.
(Continued)

*Primary Examiner* — Michael H Caley
*Assistant Examiner* — Agnes Dobrowolski
(74) *Attorney, Agent, or Firm* — JCIPRNET

(57) ABSTRACT

A viewing angle switchable display apparatus including a display panel, an electrically controlled viewing angle switching device, an electrically controlled light scattering switching device, and a backlight module is provided. The electrically controlled viewing angle switching device includes two first transparent substrates, two first transparent conductive layers, a liquid crystal layer, and a first polarizer located on a side of the electrically controlled viewing angle switching device which is far away from the display panel. The liquid crystal layer includes liquid crystal molecules, and optical axes of the liquid crystal molecules are parallel or perpendicular to a transmission axis of the first polarizer. The electrically controlled light scattering switching device is located between the display panel and the backlight module and includes two second transparent substrates, two second transparent conductive layers, and an electronically controlled polymer material layer.

14 Claims, 15 Drawing Sheets

(51) Int. Cl.
  *G02F 1/1347* (2006.01)
  *G02F 1/13357* (2006.01)
  *F21V 8/00* (2006.01)
  *G02F 1/1333* (2006.01)
  *G02F 1/1334* (2006.01)
  *G02F 1/137* (2006.01)

(52) U.S. Cl.
  CPC ......... *G02B 6/0055* (2013.01); *G02B 6/0056* (2013.01); *G02F 1/137* (2013.01); *G02F 1/1334* (2013.01); *G02F 1/13338* (2013.01); *G02F 1/13476* (2013.01); *G02F 1/133504* (2013.01); *G02F 1/133528* (2013.01); *G02F 1/133606* (2013.01); *G02F 1/13345* (2021.01); *G02F 1/133302* (2021.01)

(58) Field of Classification Search
  CPC ......... G02F 1/133504; G02F 1/133606; G02F 1/13476; G02F 1/137; G02F 1/133302; G02F 1/13345; G02F 1/133536; G02B 6/0053; G02B 6/0055; G02B 6/0056
  See application file for complete search history.

(56) References Cited

U.S. PATENT DOCUMENTS

| | | | |
|---|---|---|---|
| 7,267,849 | B2 | 9/2007 | Lazarev et al. |
| 7,880,843 | B2 * | 2/2011 | Morishita ............ G02F 1/1323 349/119 |
| 8,373,829 | B2 * | 2/2013 | Hara .................... G02B 6/005 349/113 |
| 8,982,300 | B2 | 3/2015 | Umemoto |
| 2002/0130989 | A1 | 9/2002 | Nakao et al. |
| 2005/0206814 | A1 * | 9/2005 | Histake ................ G02F 1/1323 349/112 |
| 2006/0103782 | A1 | 5/2006 | Adachi et al. |
| 2007/0188686 | A1 | 8/2007 | Yano et al. |
| 2007/0236939 | A1 | 10/2007 | Ouderkirk et al. |
| 2009/0015540 | A1 | 1/2009 | Suzuki |
| 2009/0174843 | A1 | 7/2009 | Sakai et al. |
| 2010/0026937 | A1 * | 2/2010 | Okazaki ............... G02F 1/1323 349/78 |
| 2010/0026946 | A1 | 2/2010 | Iwamoto |
| 2010/0149459 | A1 | 6/2010 | Yabuta et al. |
| 2010/0265435 | A1 | 10/2010 | Hwang et al. |
| 2010/0289989 | A1 | 11/2010 | Adachi et al. |
| 2011/0043736 | A1 | 2/2011 | Liu |
| 2011/0309398 | A1 | 11/2011 | Ito et al. |
| 2015/0208537 | A1 * | 7/2015 | Cho .................... H01L 27/3225 216/24 |
| 2015/0277012 | A1 * | 10/2015 | Nakamura ............ G02B 5/045 349/96 |
| 2015/0346532 | A1 * | 12/2015 | Do ...................... G02F 1/13363 349/96 |
| 2016/0356943 | A1 | 12/2016 | Choi et al. |
| 2017/0116937 | A1 | 4/2017 | Du et al. |
| 2017/0213874 | A1 * | 7/2017 | Liu ..................... G06F 3/0446 |
| 2017/0219859 | A1 | 8/2017 | Christophy et al. |
| 2017/0343715 | A1 | 11/2017 | Fang et al. |
| 2018/0113334 | A1 | 4/2018 | Fang et al. |
| 2018/0188603 | A1 | 7/2018 | Fang et al. |
| 2018/0321553 | A1 | 11/2018 | Robinson et al. |
| 2018/0335656 | A1 | 11/2018 | Chen et al. |

FOREIGN PATENT DOCUMENTS

| | | |
|---|---|---|
| CN | 1912659 | 2/2007 |
| CN | 1982976 | 6/2007 |
| CN | 101211067 | 7/2008 |
| CN | 101454712 | 6/2009 |
| CN | 101473168 | 7/2009 |
| CN | 101661190 | 3/2010 |
| CN | 101681061 | 3/2010 |
| CN | 101414022 | 10/2010 |
| CN | 102261599 | 11/2011 |
| CN | 202141874 | 2/2012 |
| CN | 103676288 | 3/2014 |
| CN | 104995536 | 10/2015 |
| CN | 105807485 | 7/2016 |
| EP | 03918247 | 5/1999 |
| EP | 1536269 | 6/2005 |
| EP | 2051134 | 4/2009 |
| JP | 2002055341 | 2/2002 |
| JP | 2004206130 | 7/2004 |
| JP | 2005266215 | 9/2005 |
| JP | 2007256682 | 10/2007 |
| JP | 2008003450 | 1/2008 |
| JP | 2008096458 | 4/2008 |
| JP | 2009522601 | 6/2009 |
| JP | 4369222 | 11/2009 |
| JP | 2011002596 | 1/2011 |
| JP | 2011508270 | 3/2011 |
| JP | 2014129469 | 7/2014 |
| JP | 2016062100 | 4/2016 |
| TW | 200630651 | 9/2006 |
| TW | I274918 | 3/2007 |
| TW | 200714943 | 4/2007 |
| TW | 200730935 | 8/2007 |
| TW | 200807083 | 2/2008 |
| TW | 200903053 | 1/2009 |
| TW | I309312 | 5/2009 |
| TW | 201031969 | 9/2010 |
| TW | I356937 | 1/2012 |
| TW | I364564 | 5/2012 |
| TW | I412578 | 10/2013 |
| TW | M537663 | 3/2017 |
| TW | I612360 | 1/2018 |
| WO | 2007148651 | 12/2007 |
| WO | 2009011199 | 1/2009 |
| WO | 2012090769 | 7/2012 |
| WO | WO2016/195786 * | 3/2016 |
| WO | 2016195786 | 12/2016 |
| WO | 2017061768 | 4/2017 |
| WO | 2018221413 | 12/2018 |

OTHER PUBLICATIONS

"Search Report of Europe Counterpart Application", dated Jun. 26, 2018, p. 1-p. 8.
"Search Report of Europe Counterpart Application", dated Mar. 22, 2019, p. 1-p. 7.
Jinbi Leng et al.,"Viewing angle changeable display", Proceedings of SPIE, vol. 7658, Oct. 22, 2010, pp. 1-7.
"Office Action of China Counterpart Application", dated Jan. 8, 2021, p. 1-p. 8.
"Office Action of China Counterpart Application", dated Jul. 10, 2020, p. 1-p. 8.
"Office Action of Japan Counterpart Application", dated May 11, 2021, p. 1-p. 8.
"Office Action of Japan Counterpart Application", dated Dec. 21, 2021, p. 1 -p. 9.

* cited by examiner

VIEWING ANGLE SWITCHABLE DISPLAY APPARATUS

CROSS-REFERENCE TO RELATED APPLICATION

This application claims the priority benefit of China application serial no. 201710060681.4, filed on Jan. 25, 2017. The entirety of the above-mentioned patent application is hereby incorporated by reference herein and made a part of this specification.

BACKGROUND

Field of the Invention

The invention relates to a display apparatus and more particularly, to a viewing angle switchable display apparatus.

Description of Related Art

Generally, a display apparatus offers a wide viewing angle display effect in order to allow multiple viewers to view displayed images together. However, in some situations or occasions (for example, when a private web page or confidential information is browsed in public, or a password is input), the wide viewing angle display effect may cause confidential information to be peeped by others which leads to leak of the confidential information. In order to satisfy anti-peep demands, a general method is to place a light control film (LCF) in front of the display apparatus to filter wide-angle light, while in a scenario with no anti-peep demands, the LCF is manually removed. It causes inconvenience in use that users have to manually place/remove the LCF. Therefore, a viewing angle control apparatus capable of adjusting the viewing angles of the display apparatus is demanded to select or adjust the display screen in a wide or a narrow viewing angle mode for the display apparatus according to operational requirements.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a viewing angle switchable display apparatus that controls the viewing angle in an electronically controlled manner.

Other objectives and advantages of the invention can be further illustrated by the technical features broadly embodied and described as follows.

In order to achieve one or a part of or all of the above advantages or other advantages, an embodiment of the invention provides a viewing angle switchable display apparatus which includes a display panel, an electrically controlled viewing angle switching device, an electrically controlled light scattering switching device and a backlight module. The electrically controlled viewing angle switching device is opposite to the display panel and includes two first transparent substrates, two first transparent conductive layers located between the two first transparent substrates, a liquid crystal layer located between the two first transparent conductive layers and a first polarizer located on a side of the electrically controlled viewing angle switching device which is far away from the display panel. The liquid crystal layer includes a plurality of liquid crystal molecules, and optical axes of the liquid crystal molecules are parallel or perpendicular to a transmission axis of the first polarizer. The electrically controlled light scattering switching device is located under the display panel and includes two second transparent substrates, two second transparent conductive layers located between the two second transparent substrates and an electronically controlled polymer material layer located between the two second transparent conductive layers. The electrically controlled light scattering switching device is located between the display panel and the backlight module.

In view of the above, the embodiments of the invention achieve at least one of advantages or effects as listed below. In the viewing angle switchable display apparatus of the invention, the electrically controlled viewing angle switching device can be switched between an anti-peep mode and a share mode, and the electrically controlled light scattering switching device can be switched between a transparent state and a scattering state. When the electrically controlled viewing angle switching device is switched to the anti-peep mode, the electrically controlled light scattering switching device is correspondingly switched to the transparent state, such that light beams, when passing through the electrically controlled light scattering switching device, can be prevented from being scattered, and wide-angle light beams in an anti-peep direction can be absorbed when the light beams pass through the electrically controlled viewing angle switching device. Thereby, a viewer viewing the viewing angle switchable display apparatus in a wide viewing angle can be prevented from seeing a displayed image, so as to achieve an anti-peep effect. When the electrically controlled viewing angle switching device is switched to the share mode, the electrically controlled light scattering switching device is correspondingly switched to the scattering state, such that the light beams, when passing through the electrically controlled light scattering switching device, are scattered, which contributes to enlarging the viewing angle, and intensity ratios of the wide-angle light beams in the anti-peep direction are substantially uninfluenced when the light beams pass through the electrically controlled viewing angle switching device. Thus, the viewer viewing the viewing angle switchable display apparatus in the wide angle can see the displayed image, so as to achieve an image (information) sharing effect.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
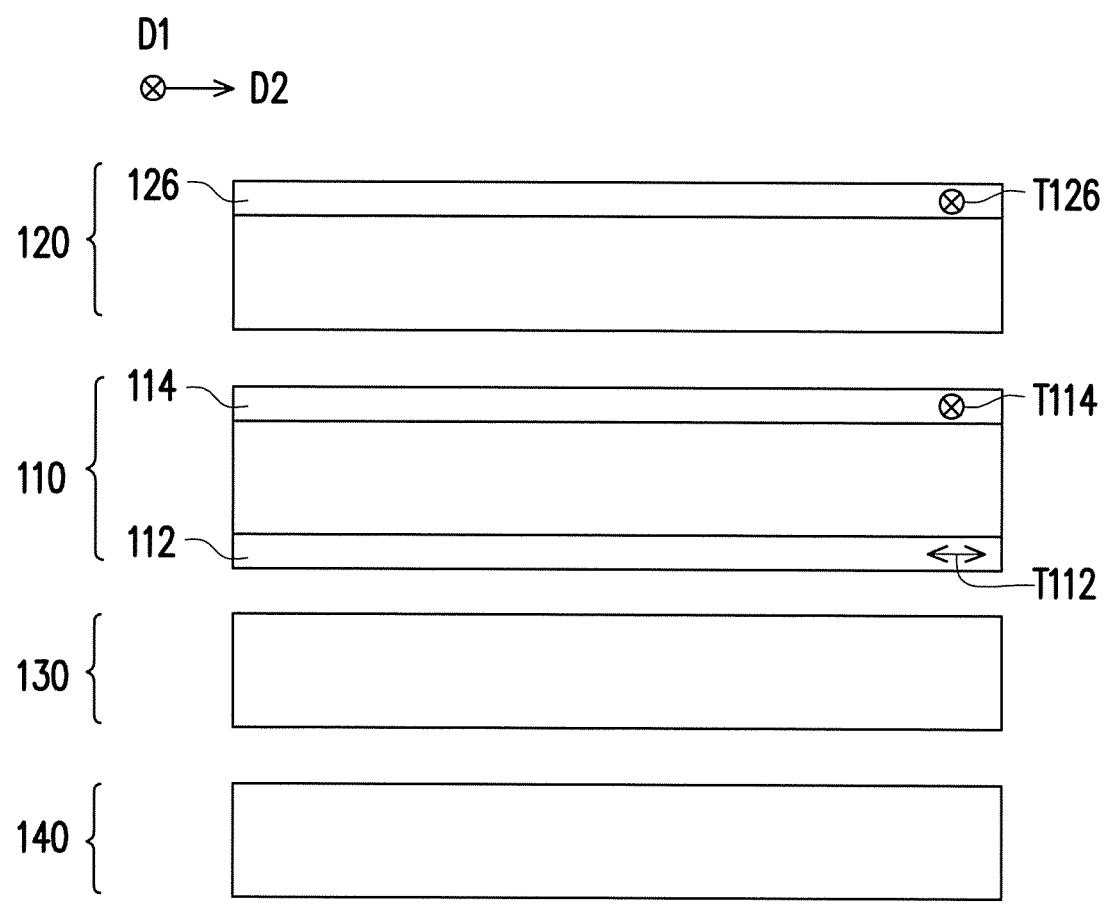
FIG. 1 is a schematic cross-sectional diagram illustrating a viewing angle switchable display apparatus according to a first embodiment of the invention.
Figure 2A:
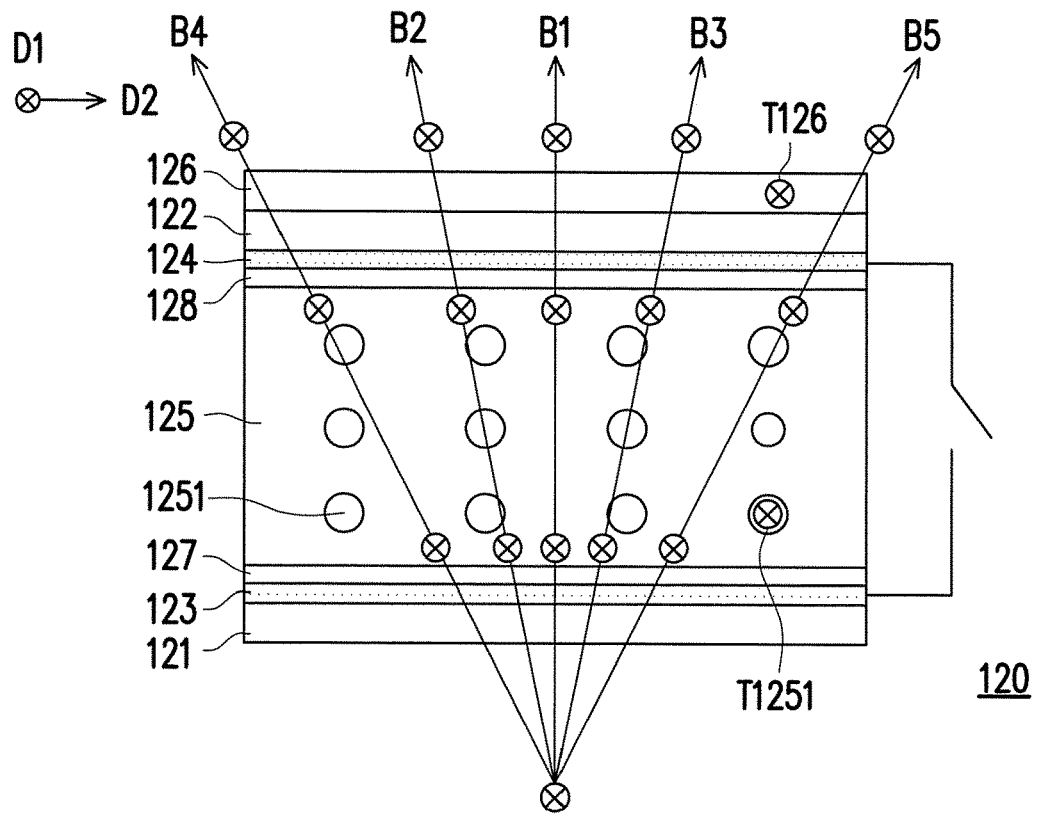
FIG. 2A and FIG. 2B are schematic cross-sectional diagrams respectively illustrating the electrically controlled viewing angle switching device depicted in FIG. 1 in a share mode and an anti-peep mode.
Figure 2B:
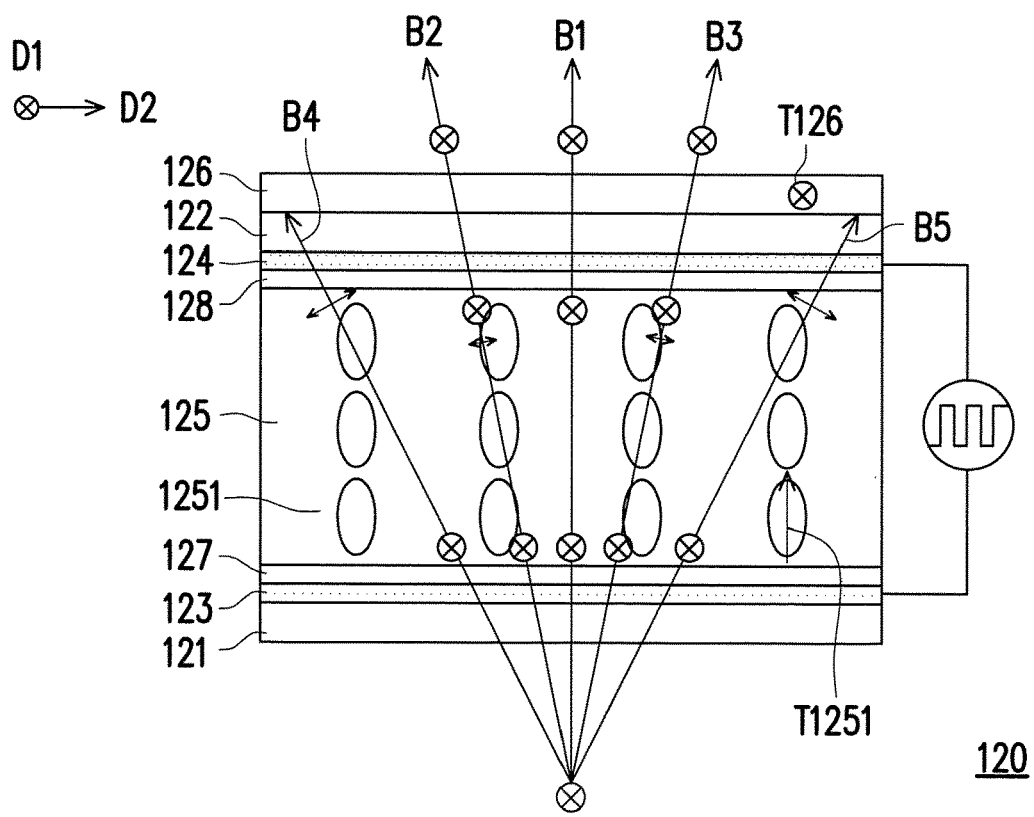
Figure 3:
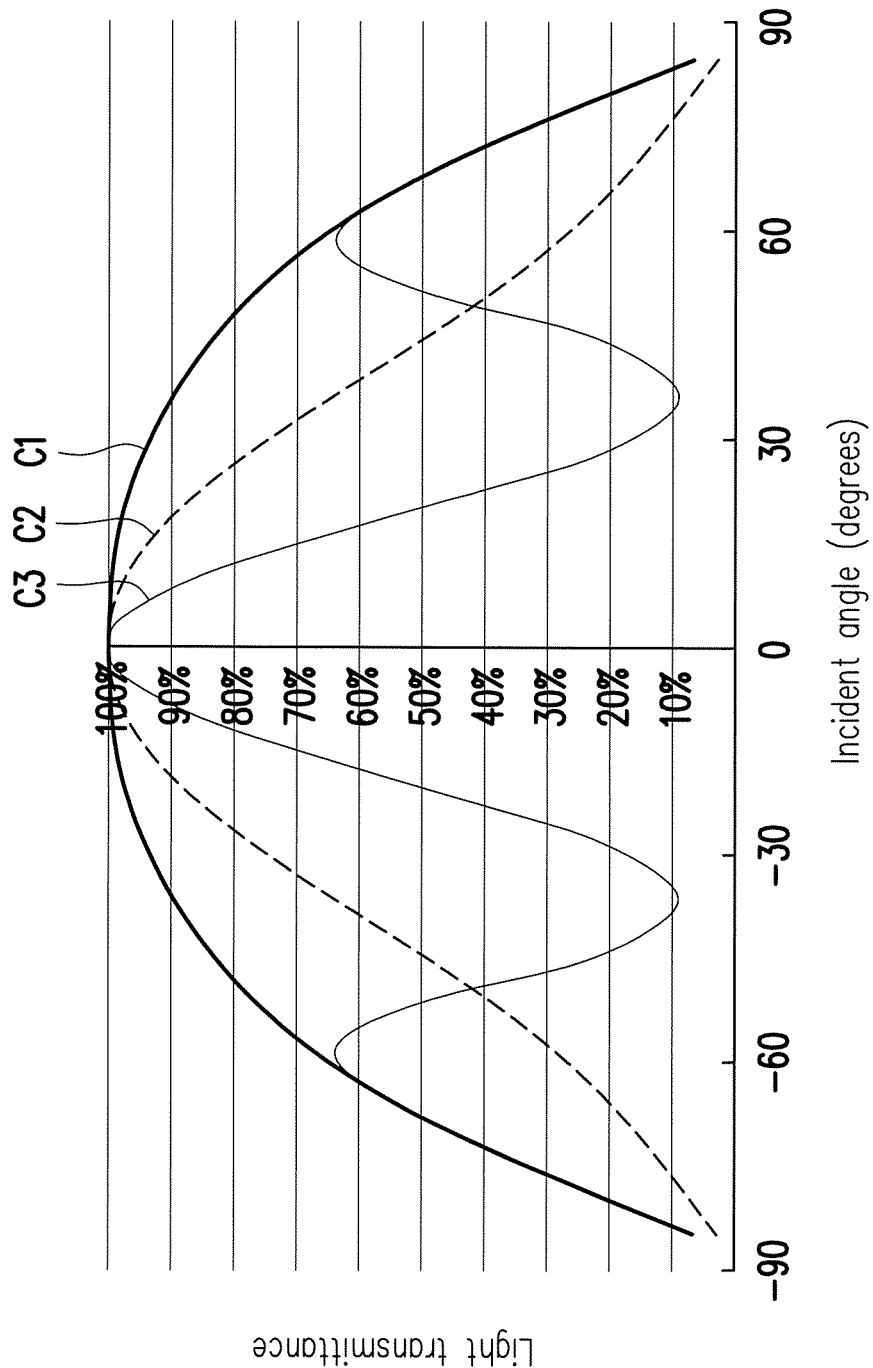
FIG. 3 is a chart illustrating the relation between incident angle and light transmittance.
Figure 4A:
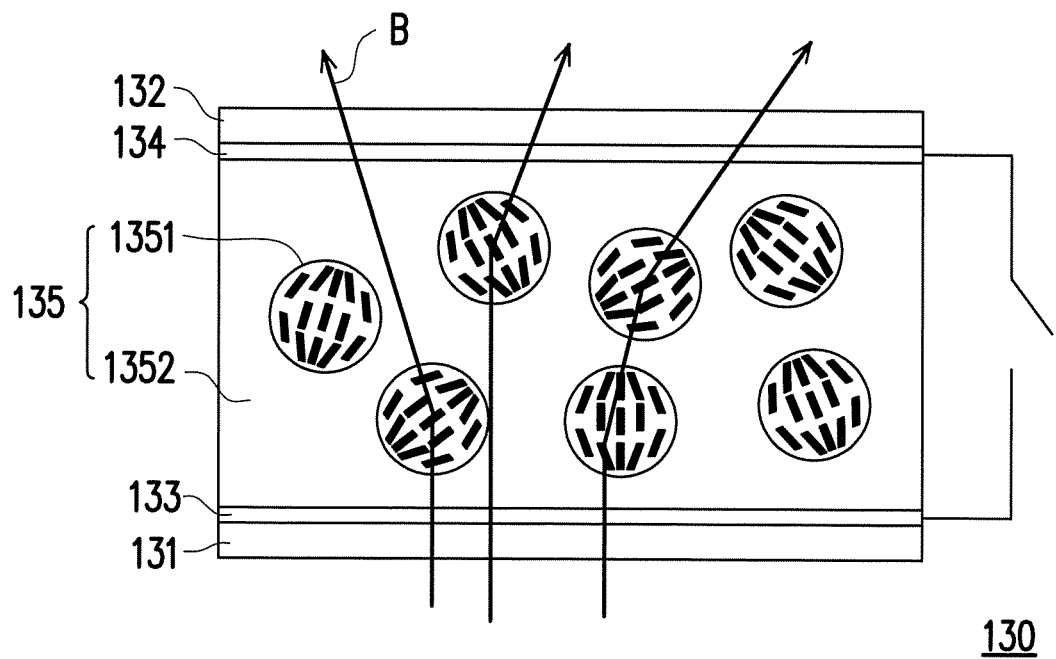
FIG. 4A and FIG. 4B are schematic cross-sectional diagrams respectively illustrating a first implementation type of the electrically controlled light scattering switching device depicted in FIG. 1 in a scattering state and a transparent state.
Figure 4B:
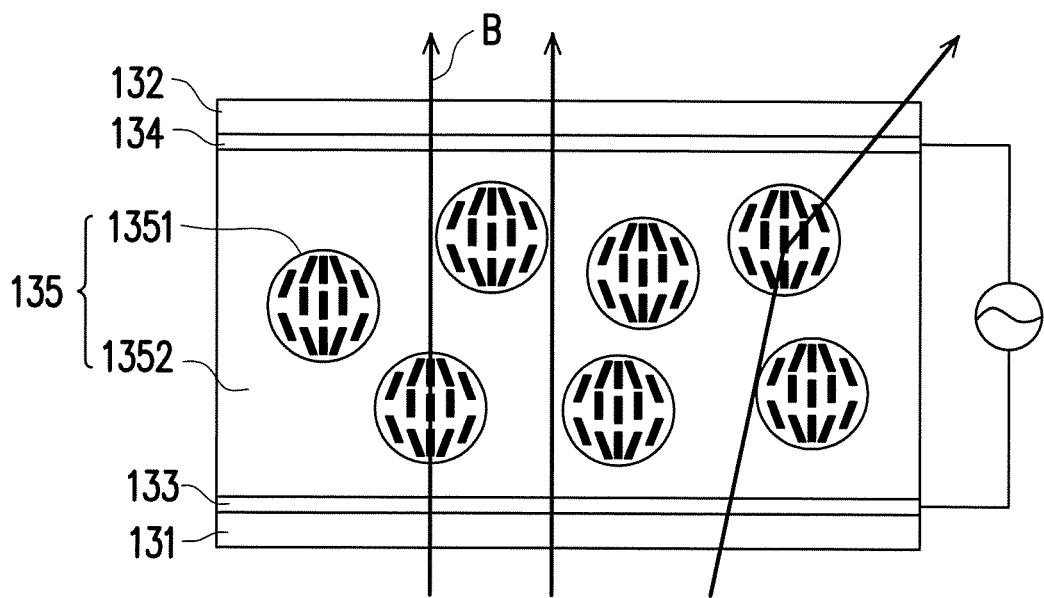
Figure 5A:
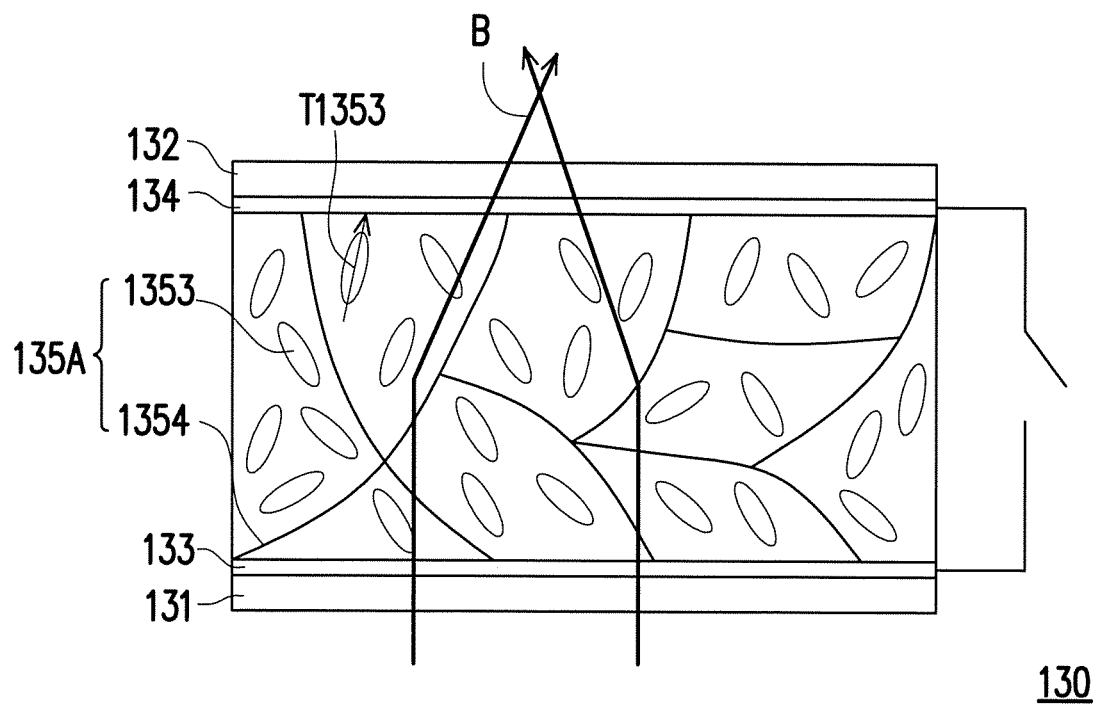
FIG. 5A and FIG. 5B are schematic cross-sectional diagrams respectively illustrating a second implementation type of the electrically controlled light scattering switching device depicted in FIG. 1 in the scattering state and the transparent state.
Figure 5B:
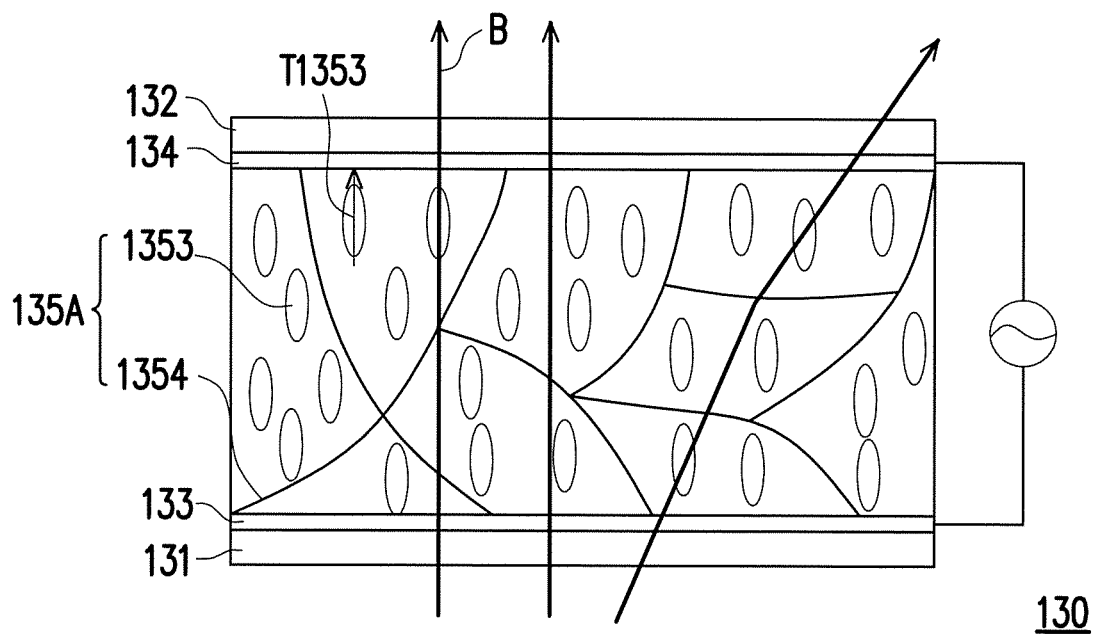
Figure 6A:
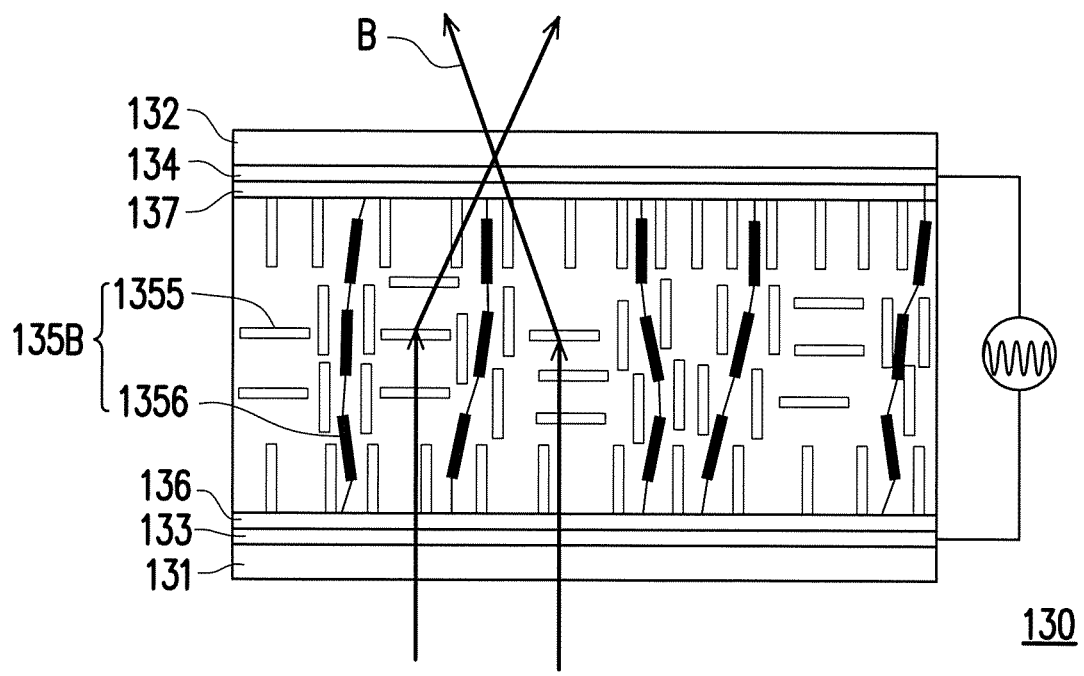
FIG. 6A and FIG. 6B are schematic cross-sectional diagrams respectively illustrating a third implementation type of the electrically controlled light scattering switching device depicted in FIG. 1 in the scattering state and the transparent state.
Figure 6B:
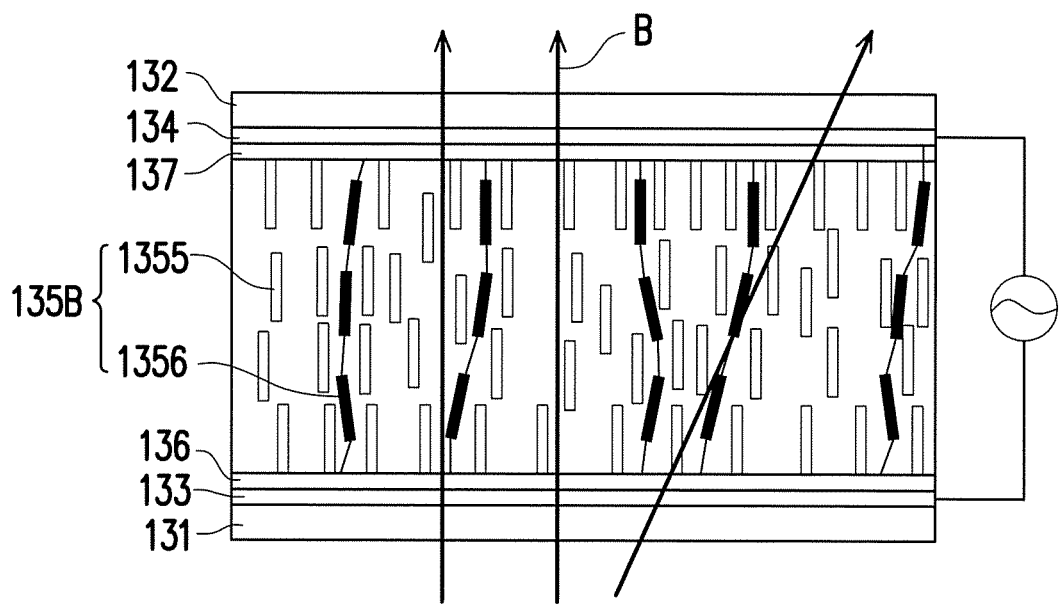
Figure 7:
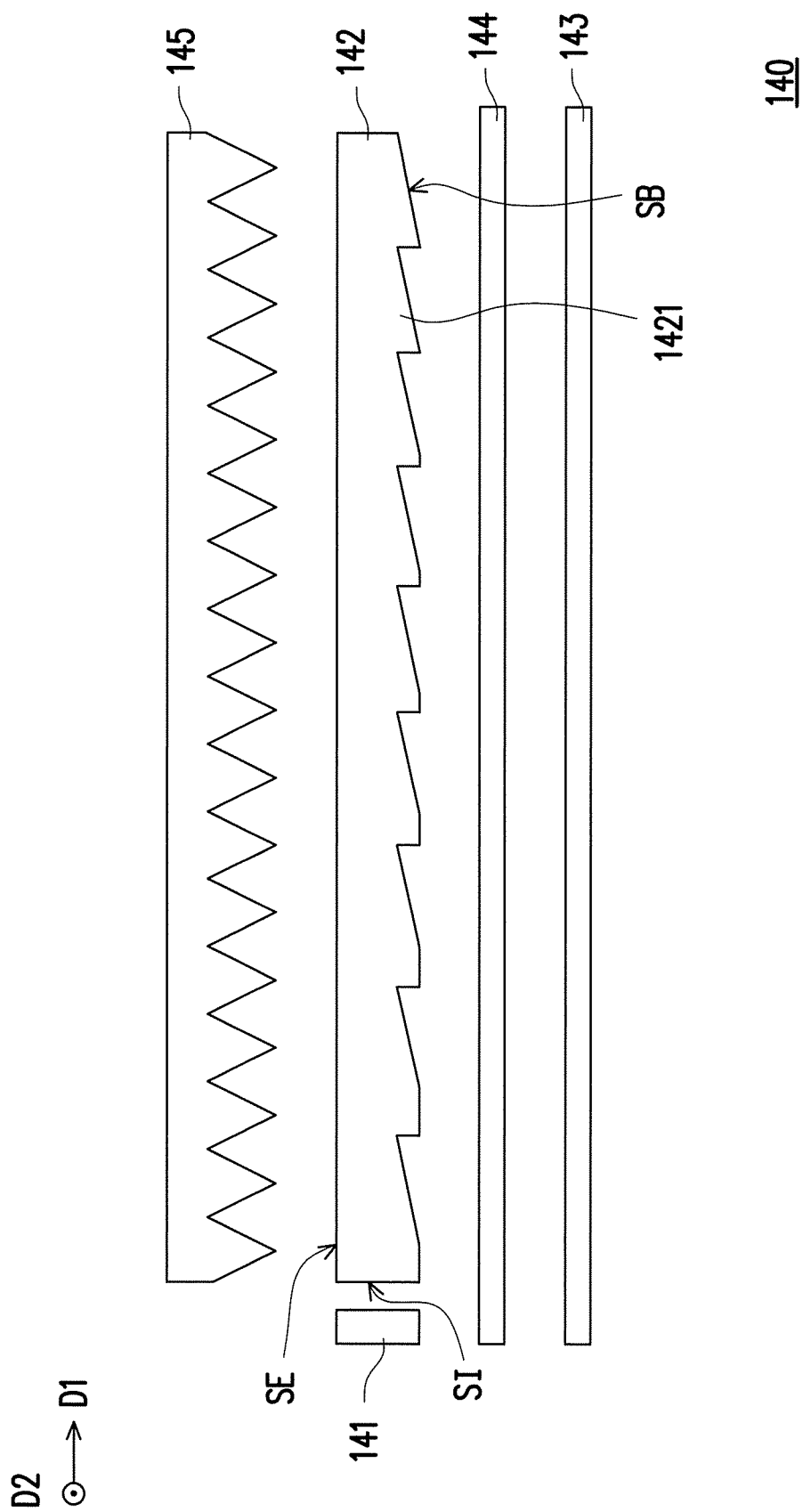
FIG. 7 is a schematic cross-sectional diagram illustrating the backlight module depicted in FIG. 1.

FIG. 1 is a schematic cross-sectional diagram illustrating a viewing angle switchable display apparatus according to a first embodiment of the invention. FIG. 2A and FIG. 2B are schematic cross-sectional diagrams respectively illustrating the electrically controlled viewing angle switching device depicted in FIG. 1 in a share mode and an anti-peep mode. FIG. 3 is a chart illustrating the relation between incident angle and light transmittance. FIG. 4A and FIG. 4B are schematic cross-sectional diagrams respectively illustrating a first implementation type of the electrically controlled light scattering switching device depicted in FIG. 1 in a scattering state and a transparent state. FIG. 5A and FIG. 5B are schematic cross-sectional diagrams respectively illustrating a second implementation type of the electrically controlled light scattering switching device depicted in FIG. 1 in the scattering state and the transparent state. FIG. 6A and FIG. 6B are schematic cross-sectional diagrams respectively illustrating a third implementation type of the electrically controlled light scattering switching device depicted in FIG. 1 in the scattering state and the transparent state. FIG. 7 is a schematic cross-sectional diagram illustrating the backlight module depicted in FIG. 1.

Referring to FIG. 1, a viewing angle switchable display apparatus 100 includes a display panel 110, an electrically controlled viewing angle switching device 120, an electrically controlled light scattering switching device 130 and a backlight module 140. The display panel 110 may be any apparatus adapted to provide images (information). For instance, the display panel 110 may be a liquid crystal display panel, but the invention is not limited thereto. In addition, the display panel 110 may include a lower polarizer 112 and an upper polarizer 114. A transmission axis T112 of the lower polarizer 112 and a transmission axis T114 of the upper polarizer 114 may be perpendicular to each other, but the invention is not limited thereto. In another embodiment, the transmission axis T112 of the lower polarizer 112 and the transmission axis T114 of the upper polarizer 114 may also be parallel to each other.

The electrically controlled viewing angle switching device 120 is opposite to the display panel 110. For instance, the display panel 110 may be located between the electrically controlled viewing angle switching device 120 and the electrically controlled light scattering switching device 130, but the invention is not limited thereto.

Referring to FIG. 2A, the electrically controlled viewing angle switching device 120 includes first transparent substrates 121 and 122, first transparent conductive layers 123 and 124, a liquid crystal layer 125 and a first polarizer 126.

The first transparent substrates 121 and 122 may be glass substrates, plastic substrates or other substrates suitable for light beams to pass through. In the embodiment, the electrically controlled viewing angle switching device 120 is more adjacent to a viewer than the display panel 110, the electrically controlled light scattering switching device 130 and the backlight module 140, and in the electrically controlled viewing angle switching device 120, the first transparent substrate 122 is more adjacent to the viewer than the first transparent substrate 121 (i.e., the first transparent substrate 122 is further away from the display panel 110 than the first transparent substrate 121). Thus, a reinforced glass substrate may be employed as the first transparent substrate 122, so as to increase mechanical strength of the electrically controlled viewing angle switching device 120 and contribute to omitting a protection cover of the viewing angle switchable display apparatus 100.

The first transparent conductive layers 123 and 124 and the liquid crystal layer 125 are located between the first transparent substrates 121 and 122. The first transparent conductive layer 123 is located between the liquid crystal layer 125 and the first transparent substrate 121, and the first transparent conductive layer 124 is located between the liquid crystal layer 125 and the first transparent substrate 122. A material of the first transparent conductive layers 123 and 124 may include metal oxide or other conductive materials that allows light beams to pass through.

The liquid crystal layer 125 is located between the first transparent conductive layers 123 and 124 and includes a plurality of liquid crystal molecules 1251. The liquid crystal molecules 1251 are adapted to deflect according to an electric field between the first transparent conductive layers 123 and 124, such that light beams passing through the liquid crystal layer 125 in different incident angles (e.g., a light beam B1 which is orthogonally incident to the electrically controlled viewing angle switching device 120, light beams B2 and B3 which are incident to the electrically controlled viewing angle switching device 120 in small angles, and light beams B4 and B5 which are incident to the electrically controlled viewing angle switching device 120 in wide angles) generate phase retardation in different degrees, thereby polarization directions of the light beams passing through the liquid crystal layer 125 with different incident angles have different degrees of change amounts.

The first polarizer 126 is located on a side of the electrically controlled viewing angle switching device 120 which is far away from the display panel 110. In the embodiment, the first polarizer 126 is disposed, for example, on the first transparent substrate 122 which is relatively far away from the display panel 110.

Each of the liquid crystal molecules 1251 has an optical axis T1251, and the first polarizer 126 has a transmission axis T126. In the embodiment, the transmission axis T126 of the first polarizer 126 is parallel to the first direction D1, and the optical axes T1251 of the liquid crystal molecules 1251 are also parallel to the first direction D1. Namely, the optical axes T1251 of the liquid crystal molecules 1251 are parallel to the transmission axis T126 of the first polarizer 126, but the invention is not limited thereto. In another embodiment, the optical axes T1251 of the liquid crystal molecules 1251 may also be perpendicular to the transmission axis T126 of the first polarizer 126.

Referring to FIG. 1 to FIG. 2B, with the transmission axis T126 of the first polarizer 126 and the transmission axis T114 of the upper polarizer 114 in the display panel 110 being parallel to each other, polarization states of the light beams incident to the electrically controlled viewing angle switching device 120 may be parallel to the transmission axis T126 of the first polarizer 126.

Referring to FIG. 2A, when the electrically controlled viewing angle switching device 120 is turned off (i.e., no potential difference exists between the first transparent conductive layers 123 and 124), the liquid crystal molecules 1251 cause no phase retardation to the light beams with various incident angles. Thus, the polarization states of the light beams B1, B2, B3, B4 and B5 passing through the liquid crystal layer 125 are all unchanged, and thus, the light beams B1, B2, B3, B4 and B5 are capable of passing through the first polarizer 126 (referring to a curve C1 in FIG. 3). That is, when the electrically controlled viewing angle switching device 120 is turned off, the viewing angle is not influenced, which is referred to as a share mode.

On other hand, referring to FIG. 2B, when the electrically controlled viewing angle switching device 120 is turned on (i.e., a potential difference exists between the first transparent conductive layers 123 and 124), the liquid crystal molecules 1251 generate the phase retardation in different degrees to the light beams with different incident angles. Thus, the polarization states of at least a part of the light beams (e.g., the light beams B2, B3, B4 and B5) passing through the liquid crystal layer 125 are changed, and light transmittance of the electrically controlled viewing angle switching device 120 in a second direction D2 (which is a direction perpendicular to the transmission axis T126 of the first polarizer 126) decreases as the incident angle increases (referring to a curve C2 in FIG. 3). That is, when the electrically controlled viewing angle switching device 120 is turned on, the light beams (e.g., the light beams B4 and B5) with the wide incident angles in the second direction D2 are incapable of passing through the first polarizer 126, which is referred to as an anti-peep mode.

Referring to FIG. 2B and a curve C3 illustrated in FIG. 3, when the amount of the phase retardation of the liquid crystal layer 125 is sufficiently large, the light transmittance of the electrically controlled viewing angle switching device 120 first increases and then decreases as the incident angle increases. In other words, by modulating a thickness of the liquid crystal layer 125 or a refractive index difference ($\Delta N$, where $\Delta N = N_e - N_o$) of the liquid crystal molecules 1251 to change the amount of the phase retardation of the liquid crystal layer 125, the light transmittance of the electrically controlled viewing angle switching device 120 in the second direction D2 may be further controlled, i.e., the size of the viewing angle in the second direction D2 may be further controlled.

Orthogonal projections of the optical axes T1251 of the liquid crystal molecules 1251 on the first polarizer 126 are perpendicular to an anti-peep direction (e.g., the second direction D2 and its opposite direction), and the transmission axis T126 of the first polarizer 126 may be perpendicular or parallel to the anti-peep direction. In the embodiment, the transmission axis T126 of the first polarizer 126 is parallel to the first direction D1, and the anti-peep direction is the second direction D2 and its opposite direction. Namely, the transmission axis T126 of the first polarizer 126 is perpendicular to the anti-peep direction, but the invention is not limited thereto. In another embodiment, the transmission axis T126 of the first polarizer 126 may be parallel to the second direction D2, and in this circumstance, the anti-peep direction is still the second direction D2 and its opposite direction. Namely, the transmission axis T126 of the first polarizer 126 is parallel to the anti-peep direction. In this architecture, the transmission axis T114 of the upper polarizer 114 of the display panel 110 depicted in FIG. 1 has to be changed to be parallel to the second direction D2, such that the polarization states of the light beams incident to the electrically controlled viewing angle switching device 120 are parallel to the transmission axis T126 of the first polarizer 126. In the architecture that the transmission axis T112 of the lower polarizer 112 and the transmission axis T114 of the upper polarizer 114 are perpendicular to each other, the transmission axis T112 of the lower polarizer 112 in the display panel 110 also has to be changed to be parallel to the first direction D1.

Based on different demands, the electrically controlled viewing angle switching device 120 may further include other film layers. For instance, the electrically controlled viewing angle switching device 120 may further include alignment layers 127 and 128. The alignment layer 127 is located between the liquid crystal layer 125 and the first transparent conductive layer 123, and the alignment layer 128 is located between the liquid crystal layer 125 and the first transparent conductive layer 124.

Referring to FIG. 1 and FIG. 4A, the electrically controlled light scattering switching device 130 is located under the display panel 110 and between the display panel 110 and the backlight module 140. The electrically controlled light scattering switching device 130 includes second transparent substrates 131 and 132, second transparent conductive layers 133 and 134 and an electronically controlled polymer material layer 135.

The second transparent substrates 131 and 132 may be glass substrates, plastic substrates or other substrates suitable for light beams to pass through. The second transparent conductive layers 133 and 134 and the electronically controlled polymer material layer 135 are located between the second transparent substrates 131 and 132. The second transparent conductive layer 133 is located between the electronically controlled polymer material layer 135 and the second transparent substrate 131, and the second transparent conductive layer 134 is located between the electronically controlled polymer material layer 135 and the second transparent substrate 132. A material of the second transparent conductive layers 133 and 134 may include metal oxide or other conductive materials that allows light beams to pass through. The electronically controlled polymer material layer 135 is located between the second transparent conductive layers 133 and 134. The electronically controlled polymer material layer 135 may include polymer dispersed liquid crystal (PDLC), polymer network liquid crystal (PNLC) or a composition containing dual frequency liquid crystal (DFLC) and reactive mesogen (RM). FIG. 4A and FIG. 4B, FIG. 5A and FIG. 5B, and FIG. 6A and FIG. 6B respectively illustrate three implementation types of the electronically controlled polymer material layer 135, but the invention is not limited thereto.

As illustrated in FIG. 4A and FIG. 4B, the electronically controlled polymer material layer 135 may include, for example, a plurality of micron-sized liquid crystal droplets 1351 and a polymer material 1352. The micron-sized liquid crystal droplets 1351 are distributed in the polymer material 1352. When the electronically controlled polymer material layer 135 is not driven by a voltage, as illustrated in FIG. 4A, the micron-sized liquid crystal droplets 1351 present a scattering state, and the light beam B, when passing through the micron-sized liquid crystal droplets 1351, is scattered. When the electronically controlled polymer material layer 135 is driven by the voltage, as illustrated in FIG. 4B, the micron-sized liquid crystal droplets 1351 present a transparent state, and most of the light beam B, when passing through the micron-sized liquid crystal droplets 1351, is not scattered.

Additionally, as illustrated in FIG. 5A and FIG. 5B, an electronically controlled polymer material layer 135A may include a plurality of liquid crystal molecules 1353 and a polymer network (PN) 1354. When the electronically controlled polymer material layer 135A is not driven by a voltage, as illustrated in FIG. 5A, the liquid crystal molecules 1353 are dispersedly distributed and present the scattering state. When the electronically controlled polymer material layer 135A is driven by the voltage, as illustrated in FIG. 5B, optical axes T1353 of the liquid crystal molecules 1353 are parallel to an electric field, and the liquid crystal molecules 1353 present the transparent state.

Further, as illustrated in FIG. 6A and FIG. 6B, an electronically controlled polymer material layer 135B may include a composition containing DFLC 1355 and RM 1356 (or an anisotropic polymer network). Additionally, the electrically controlled light scattering switching device 130 may further include vertical alignment layers 136 and 137. The vertical alignment layer 136 is located between the electronically controlled polymer material layer 135B and the second transparent conductive layer 133, and the vertical alignment layer 137 is located between the electronically controlled polymer material layer 135B and the second transparent conductive layer 134.

When the electronically controlled polymer material layer 135B is driven by a high-frequency voltage, as illustrated in FIG. 6A, molecule dipolar moments and optical axes the DFLC 1355 are perpendicular, and the DFLC 1355 located adjacent to the vertical alignment layers 136 and 137 and the RM 1356 is not turned by the electric field in the presence of an anchoring force, while the DFLC 1355 that is not located adjacent to the vertical alignment layers 136 and 137 and the reactive RM 1356 is turned by the electric field and presents the scattering state as a part of the DFLC 1355 is perpendicular to a direction of the electric field, and another part of the DFLC 1355 is parallel to the direction of the electric field. When the electronically controlled polymer material layer 135B is not driven by the voltage or driven by a low-frequency voltage, as illustrated in FIG. 6B, the DFLC 1355 and the RM 1356 present the transparent state as the molecule dipolar moments and the optical axes of the DFLC 1355 are parallel, and the optical axes of the DFLC 1355 and the RM 1356 are substantially parallel to the direction of the electric field. Additionally, by comparing the transparent states illustrated in FIG. 4B and FIG. 5B, since extraordinary refractive indices and ordinary refractive indices of the DFLC 1355 and the RM 1356 are similar to each other, and the scattering of inclined incident light may be suppressed in the transparent state, an included angle between the inclined incident light emitting from the electrically controlled light scattering switching device 130 and a normal vector of the second transparent substrate 132 is small (with reference to the rightmost light beam B illustrated in FIG. 4B, FIG. 5B and FIG. 6B), thereby enhancing an anti-peep effect.

Referring to FIG. 1 and FIG. 7, the backlight module 140 is located under the electrically controlled light scattering switching device 130, and the electrically controlled light scattering switching device 130 is located between the display panel 110 and the backlight module 140. FIG. 7 illustrates an implementation type of the backlight module 140 depicted in FIG. 1, but the invention is not limited thereto.

Referring to FIG. 7, the backlight module 140 may include a light source 141, a light guide plate 142, a reflection sheet 143, a filter sheet 144 and a reverse prism film 145. The light source 141 is located at a side of the light guide plate 142. The light guide plate 142 is located between the reverse prism film 145 and the reflection sheet 143. The filter sheet 144 is located between the light guide plate 142 and the reflection sheet 143.

In addition, the light guide plate 142 has a light-incident surface SI, a bottom surface SB and a light-emitting surface SE. The light-incident surface SI is connected with the bottom surface SB and the light-emitting surface SE, and a plurality of micro-structures 1421 may be formed on the bottom surface SB. The light source 141 is located next to the light-incident surface SI of the light guide plate 142 and adapted to emit illumination light beams toward the light-incident surface SI. The reflection sheet 143 and the filter sheet 144 are disposed under the bottom surface SB, and the reverse prism film 145 is disposed above the light-emitting surface SE. In the present embodiment, extension directions of the micro-structures 1421 and cylindrical prisms (not noted) of the reverse prism film 145 are respectively parallel to the anti-peep direction (i.e., the second direction D2 and its opposite direction), but the invention is not limited thereto. In another embodiment, the extension directions of the micro-structures 1421 and the cylindrical prisms of the reverse prism film 145 may also be respectively perpendicular to the anti-peep direction.

The disposition of the filter sheet 144 is adapted to reduce the light beams reflected back to the light guide plate 142 by the reflection sheet 143, so as to prevent the light beams from being scattered by the micro-structures 1421 of the light guide plate 142, sand thus reducing the probability of the generation of inclined scattering light. In this way, a preferable anti-peep effect may be achieved. For instance, the filter sheet 144 may be a translucent film containing a light absorbing material (e.g., a dye), an absorptive polarizer, or a composite polarizer composed of an absorptive polarizer and a reflective polarizer. In an embodiment, the disposition of the filter sheet 144 may be omitted. Additionally, a reflection sheet with a lower reflectivity (which is lower than 50%, for example) may be used in replacement with an ordinary reflection sheet with a higher reflectivity (which is higher than 90%, for example), so as to further enhance the anti-peep effect.

When the filter sheet 144 is a translucent film containing a light absorbing material, the lower the absorbance of the filter sheet 144, the higher the light transmittance. In other words, as the absorbance of the filter sheet 144 decreases, the light beams reflected back to the light guide plate 142 by the reflection sheet 143 increase. Therefore, the higher the brightness of the display panel 110, the poorer the anti-peep effect. When the light transmittance of the filter sheet 144 is more than 60%, the display panel 110 has a higher brightness and a poorer anti-peep effect. When the light transmittance of the filter sheet 144 is less than 60%, the display panel 110 has a lower brightness, but a better anti-peep effect.

Referring to FIG. 1 and FIG. 7, when the filter sheet 144 is an absorptive polarizer, a higher brightness may be obtained if a transmission axis (not shown) of the absorptive polarizer is parallel to the transmission axis T112 of the lower polarizer 112 of the display panel 110, but a pooper anti-peep effect may be obtained as more light beams are reflected back to the light guide plate 142 by the reflection sheet 143. If the transmission axis of the absorptive polarizer is perpendicular to the transmission axis T112 of the lower polarizer 112 of the display panel 110, the brightness of the display panel 110 may be lower, but a higher portion of the light beams which are reflected back to the light guide plate 142 by the reflection sheet 143 are absorbed by the lower polarizer 112 of the display panel 110, and thus, the anti-peep effect may be preferable. Accordingly, the included angle between the transmission axis of the absorptive polarizer and the transmission axis T112 of the lower polarizer 112 of the display panel 110 may be adjusted according to the desired brightness and anti-peep effect.

When the filter sheet 144 is a composite polarizer composed of an absorptive polarizer and a reflective polarizer, the absorptive polarizer in the filter sheet 144 may be located between the reflective polarizer and the reflection sheet 143. Additionally, an angle included between a transmission axis of the absorptive polarizer and a transmission axis (or a reflection axis) of the reflective polarizer may be adjusted to adjust a ratio of the light beams which are reflected back to the light guide plate 142, scattered by the micro-structures 1421 of light guide plate 142, and pass through the lower polarizer 112 of the display panel 110, thereby obtaining the desired brightness and anti-peep effect.

Table 1 shows influence on the brightness and the anti-peep effect by the relative relation among an angle of the transmission axis of the lower polarizer of the display panel, an angle of the reflection axis of the reflective polarizer of the filter sheet (which has an included angle of 90 degrees with the transmission axis of the reflective polarizer), and an angle of the transmission axis of the absorptive polarizer of the filter sheet. In Table 1, numbers 1 to 4 are used to represent good and bad of the brightness of the display panel and the anti-peep effect. Particularly, in term of the brightness of the display panel, the greater number represents the higher brightness. In term of the anti-peep effect, the greater number represents the better anti-peep effect. It should be additionally mentioned that in Table 1, the angle of the transmission axis of the lower polarizer of the display panel is indicated as 0 degree only for descriptive convenience, and actually, the angle of the transmission axis of the lower polarizer of the display panel may by any other angle, and evaluations of the brightness of the display panel and the anti-peep effect will remain unchanged as long as the angles of and the relative included angle between the reflection axis of the reflective polarizer and the transmission axis of the absorptive polarizer remain unchanged.

TABLE 1

|  | Condition 1 | Condition 2 | Condition 3 | Condition 4 |
| --- | --- | --- | --- | --- |
| Angle (°) of transmission axis of lower polarizer of display panel | 0 | 0 | 0 | 0 |
| Angle (°) of reflection axis of reflective polarizer of filter sheet | 0 | 0 | 90 | 90 |
| Angle (°) of transmission axis of absorptive polarizer of filter sheet | 0 | 90 | 0 | 90 |
| Brightness of display panel | 4 | 3 | 2 | 1 |
| Anti-peep effect | 2 | 1 | 3 | 4 |

Additionally, in the filter sheet, when the angle of the reflection axis of the reflective polarizer and the angle of the transmission axis of the absorptive polarizer are not 0 degree or 90 degrees, the evaluations of the brightness of the display panel and the anti-peep effect fall within the ranges corresponding to the angles. For example, when the angle of the transmission axis of the lower polarizer of the display panel is 0 degree, the angle of the reflection axis of the reflective polarizer is 0 degree, and the angle of the transmission axis of the absorptive polarizer is 20 degrees, the evaluation of the brightness of the display panel ranges between 4 and 3, and the evaluation of the anti-peep effect ranges between 2 and 1. Thus, if a higher brightness of the display panel but a less good anti-peep effect are desired, a condition that "the angle of the reflection axis of the reflective polarizer is 0 degree, and the angle of the transmission axis of the absorptive polarizer ranges from 0 degree to 90 degrees or from 0 degree to 45 degrees" may be selected when the angle of the transmission axis of the lower polarizer of the display panel is 0 degree. If a lower brightness of the display panel but a better anti-peep effect are desired, a condition that "the angle of the reflection axis of the reflective polarizer is 90 degrees, and the angle of the transmission axis of the absorptive polarizer ranges from 0 degree to 90 degrees or from 45 degrees to 90 degrees" may be selected when the angle of the transmission axis of the lower polarizer of the display panel is 0 degree.

FIG. 8 to FIG. 21 are schematic cross-sectional diagrams respectively illustrating viewing angle switchable display apparatuses according to other embodiments of the invention. Therein, the display panel, the electrically controlled light scattering switching device and the backlight module of the viewing angle switchable display apparatus are respectively omitted in FIG. 8 and FIG. 9. The same or similar reference numerals represent the same or similar elements in the following embodiments, and the related contents may refer to the corresponding descriptions with respect to the embodiments illustrated in FIG. 1 to FIG. 7 and will not be repeated hereinafter.

Figure 8:
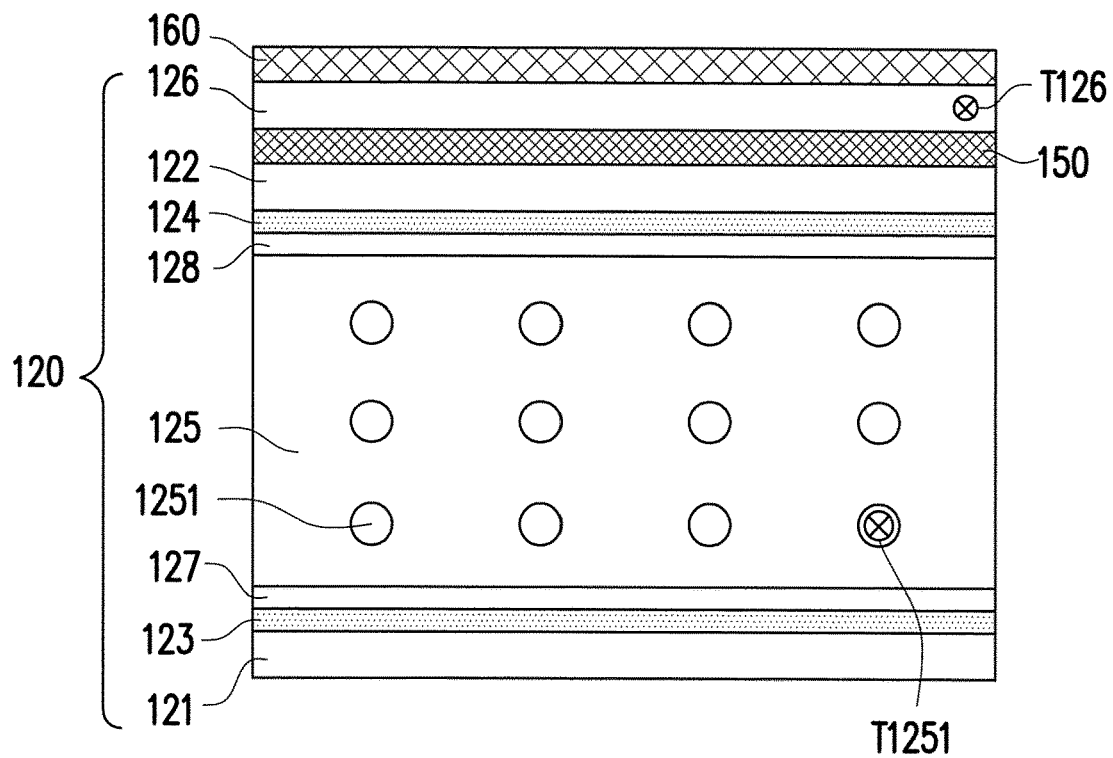
FIG. 8 to FIG. 21 are schematic cross-sectional diagrams respectively illustrating viewing angle switchable display apparatuses according to other embodiments of the invention.

Referring to FIG. 8, the viewing angle switchable display apparatus may further include a touch sensing element 150 to provide a touch sensing function. The touch sensing element 150 may be located between the first polarizer 126 and the first transparent substrate 122 and have single-layer or multi-layer touch sensing electrodes (not shown). The touch sensing electrodes may be disposed on the first transparent substrate 122 or the first polarizer 126. Alternatively, the multi-layer touch sensing electrodes may be respectively disposed on the first transparent substrate 122 and the first polarizer 126, and then attached thereto through an insulated transparent adhesive layer. Moreover, the touch sensing electrodes may be disposed on at least one thin film or at least one substrate (which is not shown) in advance and then attached to the first transparent substrate 122 and the first polarizer 126 through a transparent adhesive layer.

In addition, the viewing angle switchable display apparatus may further include a decoration layer 160. The decoration layer 160 is located on the electrically controlled viewing angle switching device 120, and the first polarizer 126 is located between the decoration layer 160 and the touch sensing element 150. The decoration layer 160 is disposed, for example, in the periphery of the first polarizer 126 to shield the elements (for example, peripheral traces of the touch sensing element 150) that are not desired to be seen. Additionally, the decoration layer 160 exposes a display region of the display panel 110, so as to prevent display light beams from being shielded. The decoration layer 160 may be made of ink or other light absorbing material.

Figure 9:
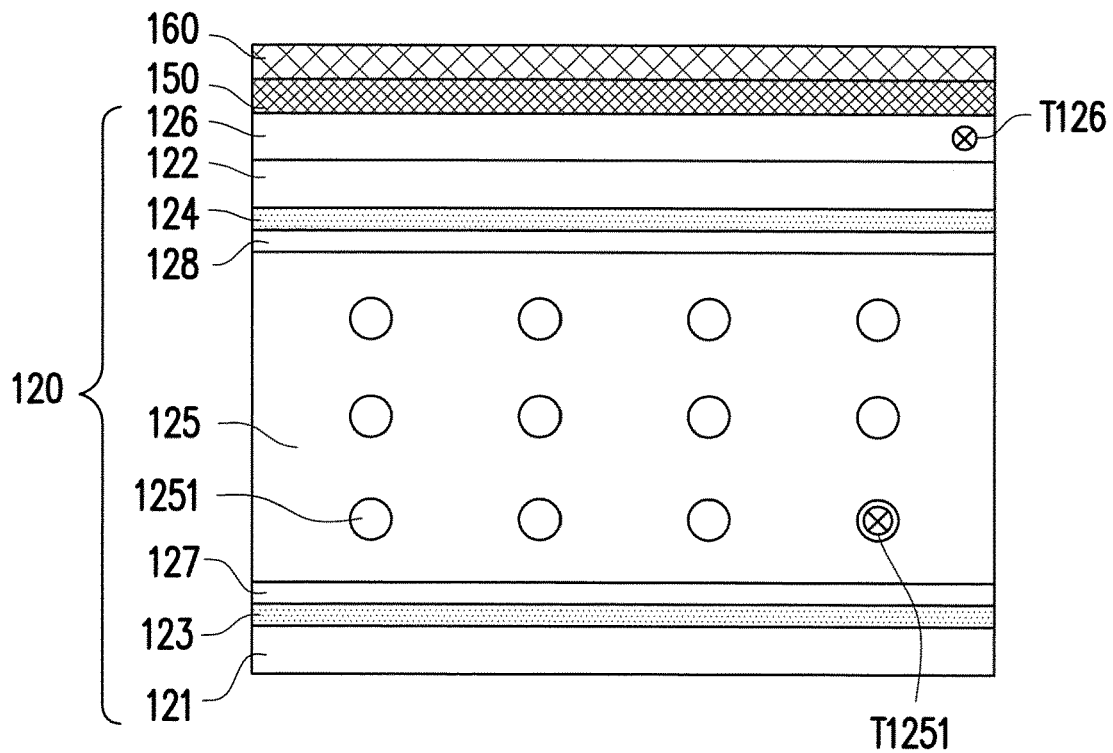

In yet another embodiment, as illustrated in FIG. 9, the touch sensing element 150 may also be located on the first polarizer 126. Particularly, the touch sensing element 150 and the decoration layer 160 may be sequentially stacked on the electrically controlled viewing angle switching device 120, and thereby, the touch sensing element 150 is located between the decoration layer 160 and the first polarizer 126.

Figure 10:
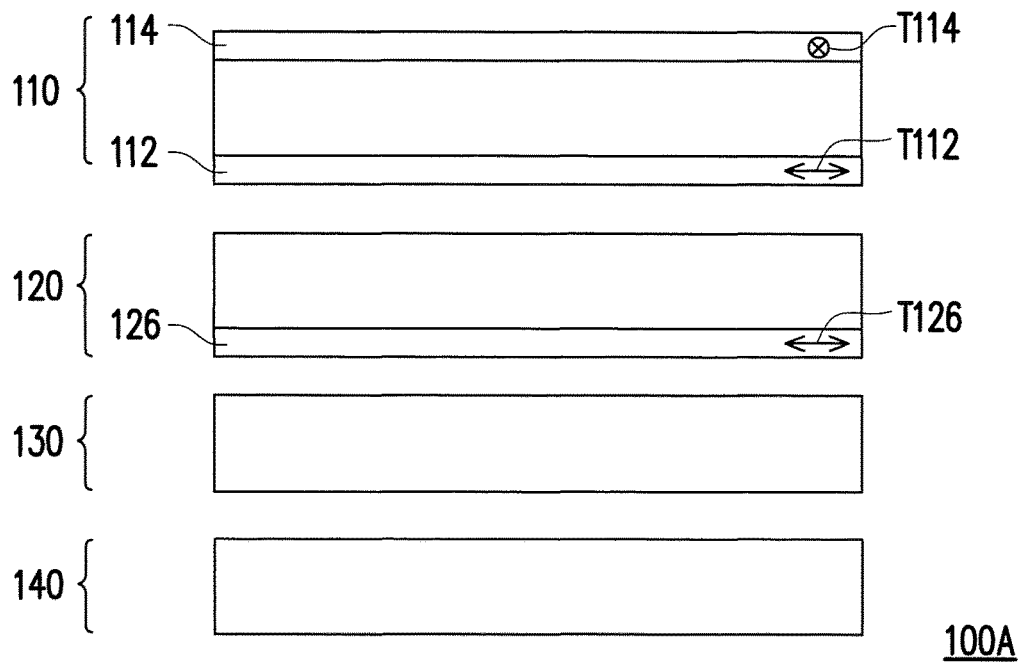

Referring to FIG. 1 and FIG. 10, a viewing angle switchable display apparatus 100A illustrated in FIG. 10 is similar to the viewing angle switchable display apparatus 100 in FIG. 1, and the main difference therebetween will be described as follows. In the viewing angle switchable display apparatus 100 illustrated in FIG. 1, the display panel 110 is located between the electrically controlled viewing angle switching device 120 and the electrically controlled light scattering switching device 130, and the first polarizer 126 is disposed on the first transparent substrate 122 (referring to FIG. 2A). In the viewing angle switchable display apparatus 100A illustrated in FIG. 10, the electrically controlled viewing angle switching device 120 is located between the display panel 110 and the electrically controlled light scattering switching device 130, and the first polarizer 126 is disposed on a side of the first transparent substrate 121 (referring to FIG. 2A) which is far away from the display panel 110, and thereby, the first transparent substrate 121 is located between the first polarizer 126 and the first transparent conductive layer 123. Additionally, the transmission axis T126 of the first polarizer 126 is parallel to the transmission axis of one of the polarizers in the display panel 110 which is adjacent to the first polarizer 126, for example, the transmission axis T112 of the lower polarizer 112.

Figure 11:
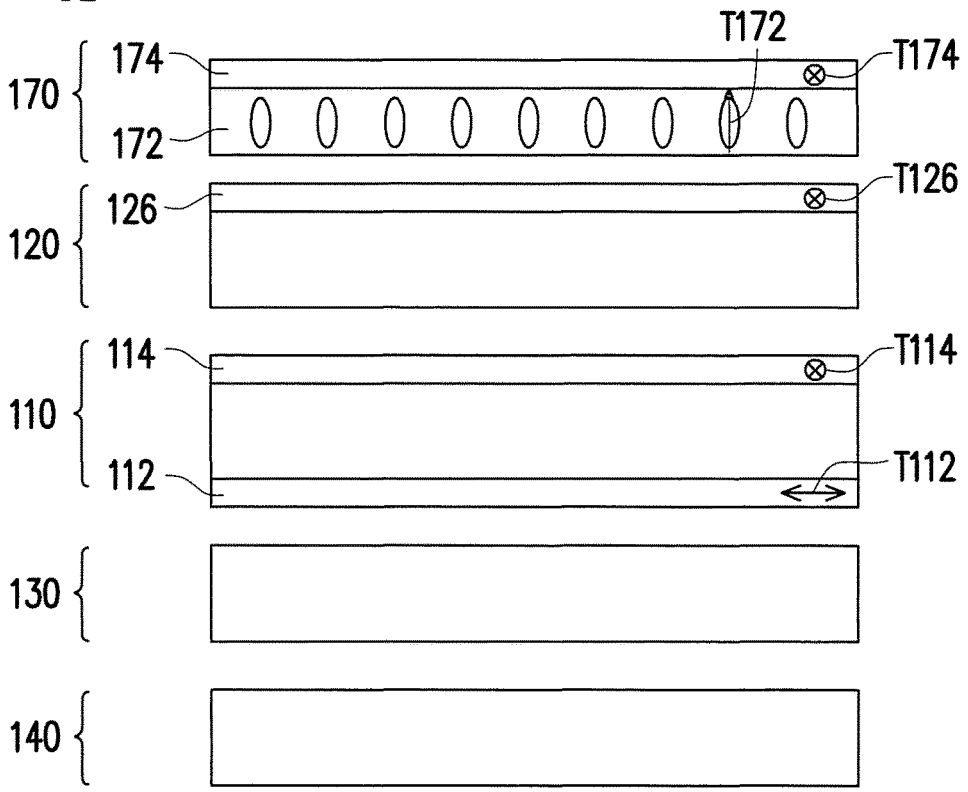

Referring to FIG. 1 and FIG. 11, a viewing angle switchable display apparatus 100B illustrated in FIG. 11 is similar to the viewing angle switchable display apparatus 100 illustrated in FIG. 1, and the main difference therebetween will be described as follows. The viewing angle switchable display apparatus 100B illustrated in FIG. 11 further includes a polarized viewing angle control element 170. The polarized viewing angle control element 170 is located above the backlight module 140 and includes a phase retardation film 172 and a second polarizer 174. The second polarizer 174 is disposed on a side of the phase retardation film 172 which is far away from the display panel 110. In the embodiment, the polarized viewing angle control element 170 is located on the electrically controlled viewing angle switching device 120, and thereby, the electrically controlled viewing angle switching device 120 is located between the polarized viewing angle control element 170 and the display panel 110, and the phase retardation film 172 is located between the second polarizer 174 and the electrically controlled viewing angle switching device 120.

The phase retardation film 172 is, for example, a C-plate, where an optical axis T172 of the phase retardation film 172 is perpendicular to the second polarizer 174. The second polarizer 174 is, for example, an absorptive polarizer, and a transmission axis T174 of the second polarizer 174 is parallel to a transmission axis T126 of the first polarizer 126. In this architecture, the polarized viewing angle control element 170 may further filter the light beams which have included angles ranging 45±15 degrees with the anti-peep direction (e.g., the second direction D2 and its opposite direction) at an azimuth, thereby enlarging an anti-peep angle range at the azimuth.

In another embodiment, the phase retardation film 172 may also be an O-plate. In this way, the polarized viewing angle control element 170 may further enlarge the angle range for filtering the light beams in the anti-peep direction, such that the anti-peep angle range in the anti-peep direction may be enlarged. In yet another embodiment, the phase retardation film 172 may also be a composite plate composed of an O-plate and a C-plate to enlarge the anti-peep angle range at the azimuth and the anti-peep angle range in the anti-peep direction.

Figure 12:
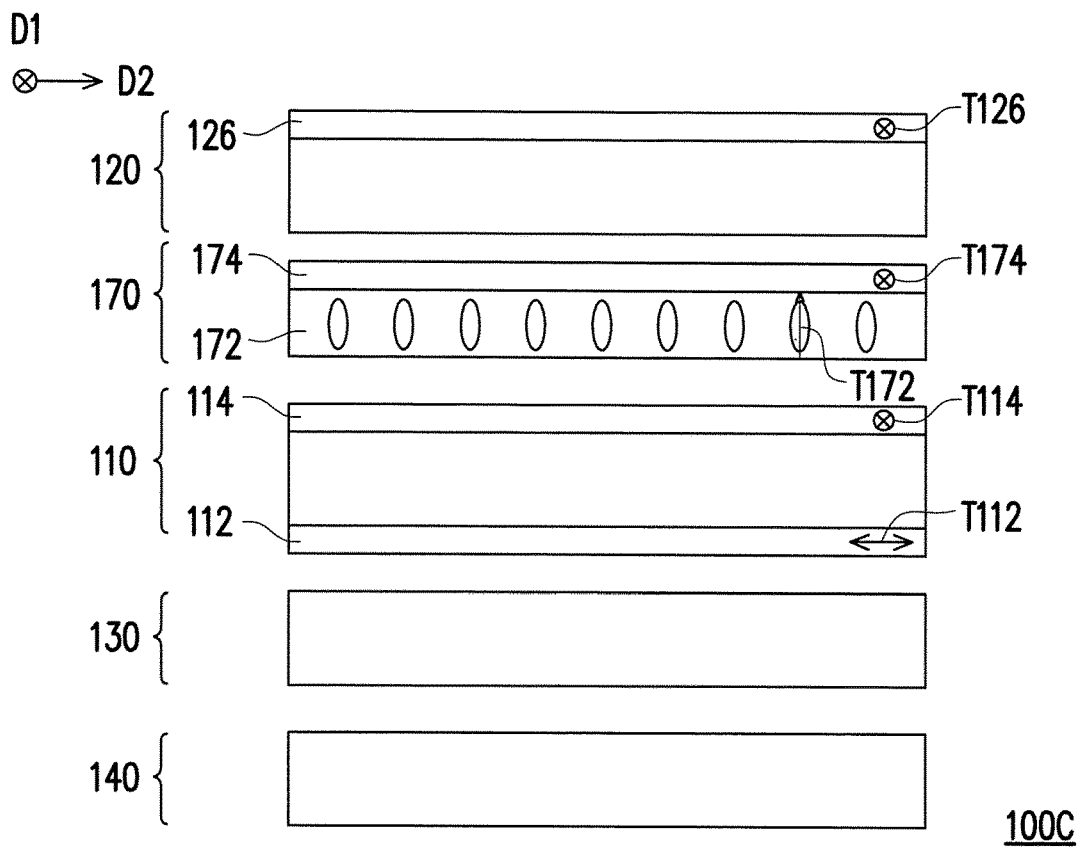

Referring to FIG. 11 and FIG. 12, a viewing angle switchable display apparatus 100C illustrated in FIG. 12 is similar to the viewing angle switchable display apparatus 100B illustrated in FIG. 11, and the main difference therebetween will be described as follows. In the viewing angle switchable display apparatus 100C illustrated in FIG. 12, the polarized viewing angle control element 170 is located between the electrically controlled viewing angle switching device 120 and the display panel 110, and the phase retardation film 172 is located between the second polarizer 174 and the display panel 110.

Figure 13:
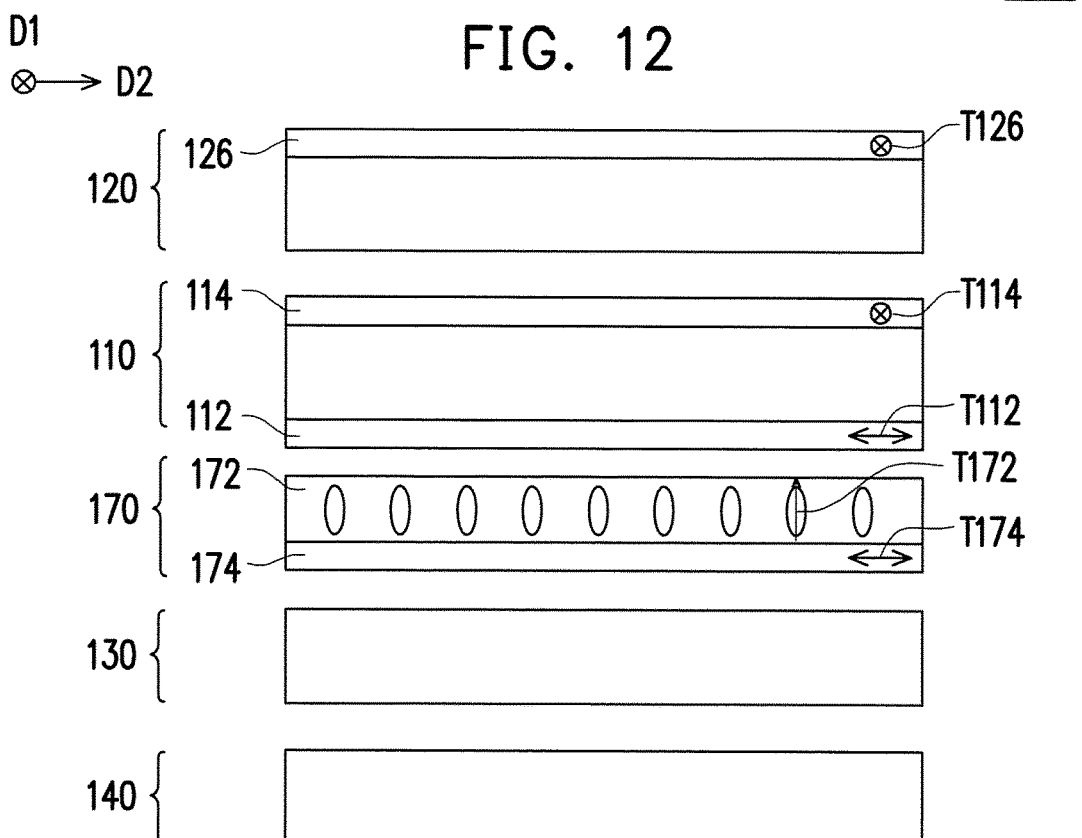

Referring to FIG. 12 and FIG. 13, a viewing angle switchable display apparatus 100D illustrated in FIG. 13 is similar to the viewing angle switchable display apparatus 100C illustrated in FIG. 12, and the main difference therebetween will be described as follows. In the viewing angle switchable display apparatus 100D illustrated in FIG. 13, the polarized viewing angle control element 170 is located between the display panel 110 and the electrically controlled light scattering switching device 130, and the second polarizer 174 is located between the phase retardation film 172 and the electrically controlled light scattering switching device 130. Additionally, the transmission axis T174 of the second polarizer 174 is parallel to the transmission axis of one of the polarizers in the display panel 110 which is adjacent to the second polarizer 174, for example, the transmission axis T112 of the lower polarizer 112.

Figure 14:
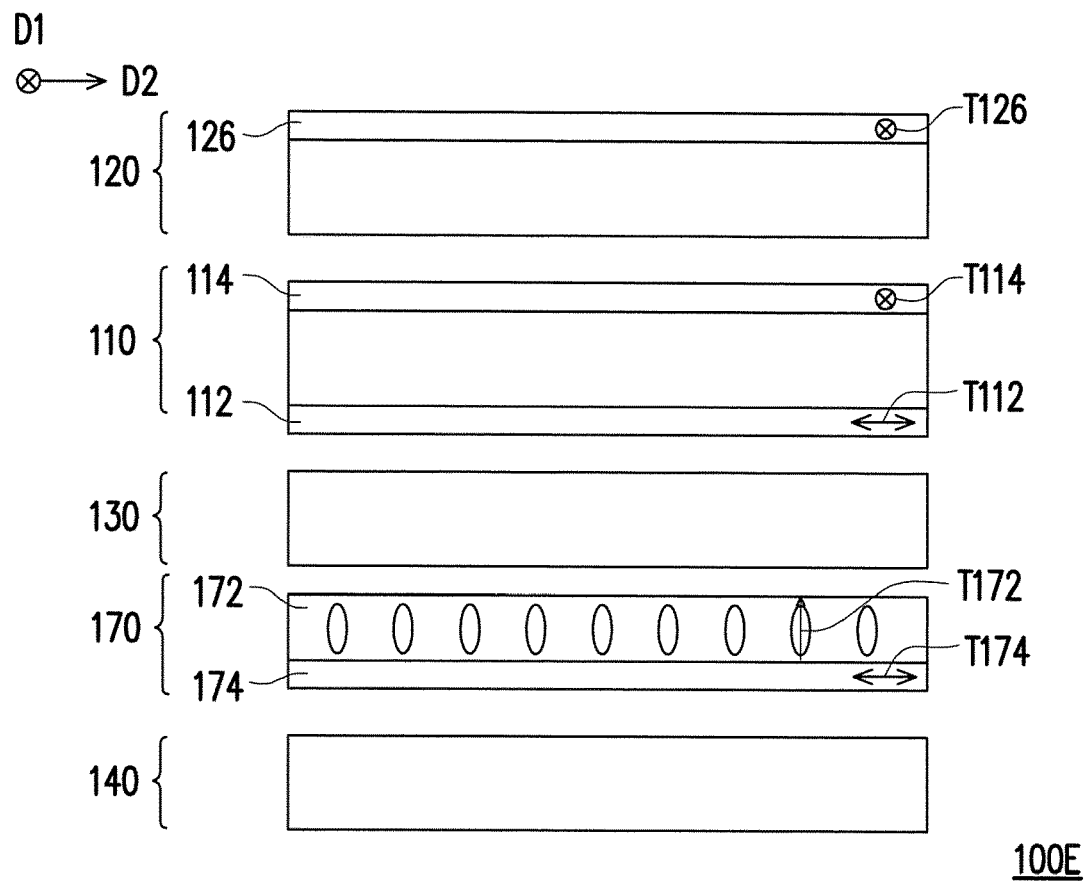

Referring to FIG. 13 and FIG. 14, a viewing angle switchable display apparatus 100E illustrated in FIG. 14 is similar to the viewing angle switchable display apparatus 100D illustrated in FIG. 13, and the main difference therebetween will be described as follows. In the viewing angle switchable display apparatus 100E illustrated in FIG. 14, the polarized viewing angle control element 170 is located between the electrically controlled light scattering switching device 130 and the backlight module 140, and the second polarizer 174 is located between the phase retardation film 172 and the backlight module 140.

Figure 15:
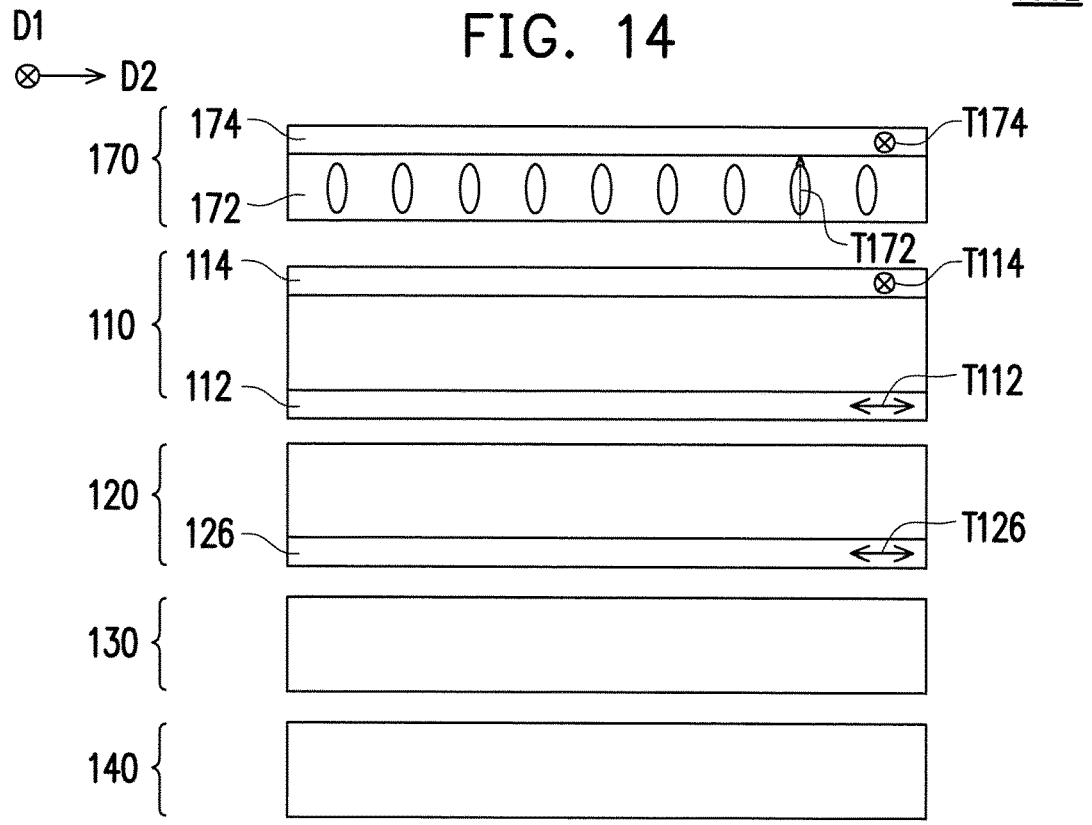

Referring to FIG. 10 and FIG. 15, a viewing angle switchable display apparatus 100F illustrated in FIG. 15 is similar to the viewing angle switchable display apparatus 100A illustrated in FIG. 10, and the main difference therebetween will be described as follows. The viewing angle switchable display apparatus 100F illustrated in FIG. 15 further includes a polarized viewing angle control element 170, and therein, the description related to each film layer in the polarized viewing angle control element 170 may refer to the related descriptions corresponding to the polarized viewing angle control element 170 illustrated in FIG. 11 and will not be repeated hereinafter.

Figure 16:
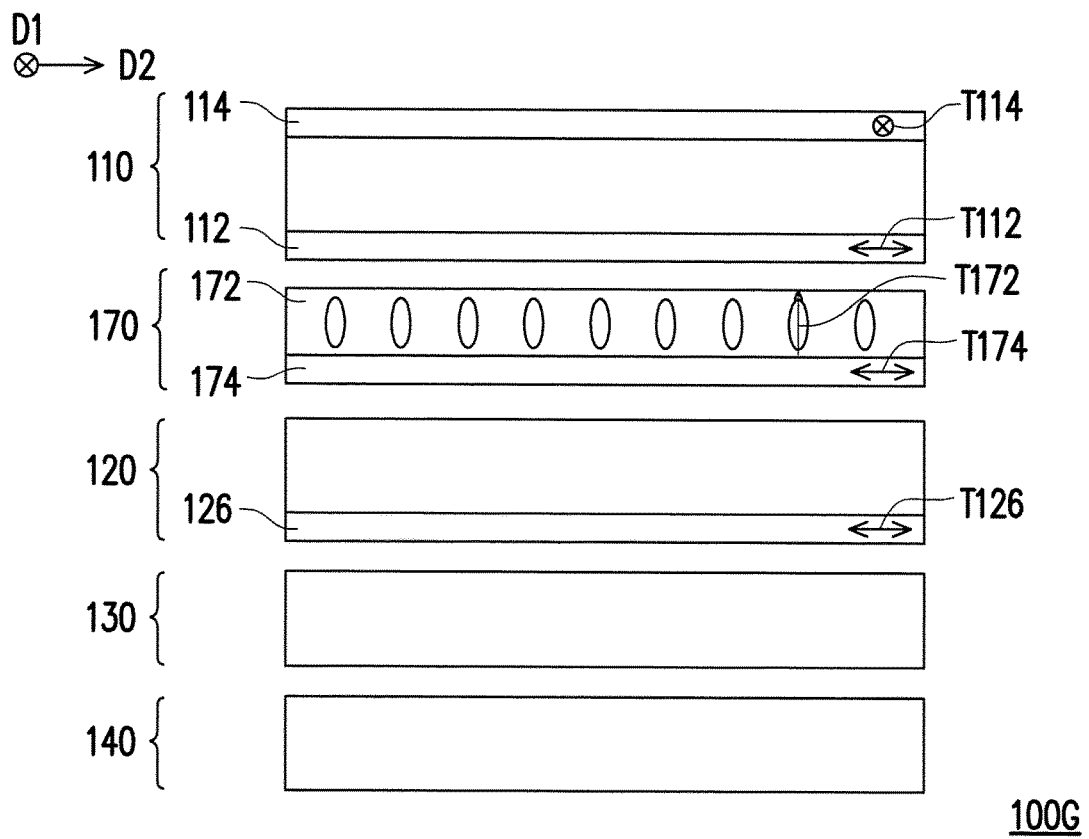

Referring to FIG. 15 and FIG. 16, a viewing angle switchable display apparatus 100G illustrated in FIG. 16 is similar to the viewing angle switchable display apparatus 100F illustrated in FIG. 15, and the main difference therebetween will be described as follows. In the viewing angle switchable display apparatus 100G illustrated in FIG. 16, the polarized viewing angle control element 170 is located between the display panel 110 and the electrically controlled viewing angle switching device 120, and the second polarizer 174 is located between the phase retardation film 172 and the electrically controlled viewing angle switching device 120. Additionally, the transmission axis T174 of the second polarizer 174 is parallel to the transmission axis of one of the polarizers in the display panel 110 which is adjacent to the second polarizer 174, for example, the transmission axis T112 of the lower polarizer 112.

Figure 17:
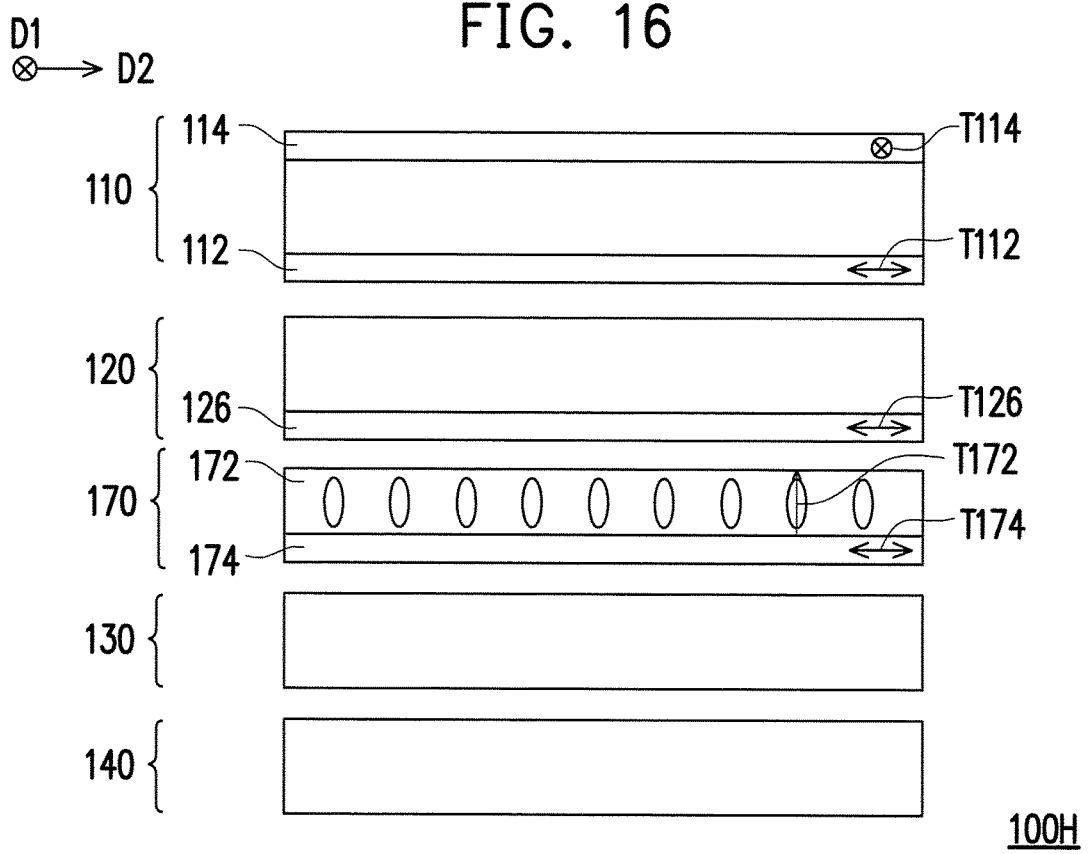

Referring to FIG. 16 and FIG. 17, a viewing angle switchable display apparatus 100H illustrated in FIG. 17 is similar to the viewing angle switchable display apparatus 100G illustrated in FIG. 16, and the main difference therebetween will be described as follows. In the viewing angle switchable display apparatus 100H illustrated in FIG. 17, the polarized viewing angle control element 170 is located between the electrically controlled viewing angle switching device 120 and the electrically controlled light scattering switching device 130, and the second polarizer 174 is located between the phase retardation film 172 and the electrically controlled light scattering switching device 130.

Figure 18:
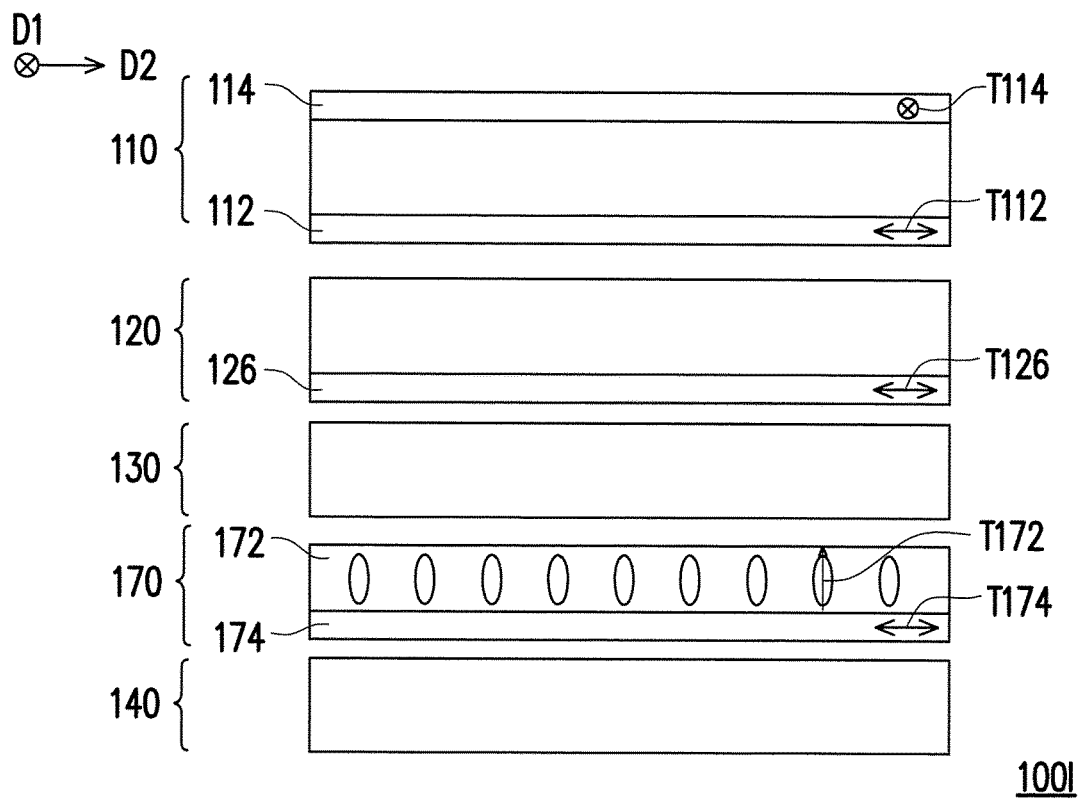

Referring to FIG. 17 and FIG. 18, a viewing angle switchable display apparatus 100I illustrated in FIG. 18 is similar to the viewing angle switchable display apparatus 100H illustrated in FIG. 17, and the main difference therebetween will be described as follows. In the viewing angle switchable display apparatus 100I illustrated in FIG. 18, the polarized viewing angle control element 170 is located between the electrically controlled light scattering switching device 130 and the backlight module 140, and the second polarizer 174 is located between the phase retardation film 172 and the backlight module 140.

Figure 19:
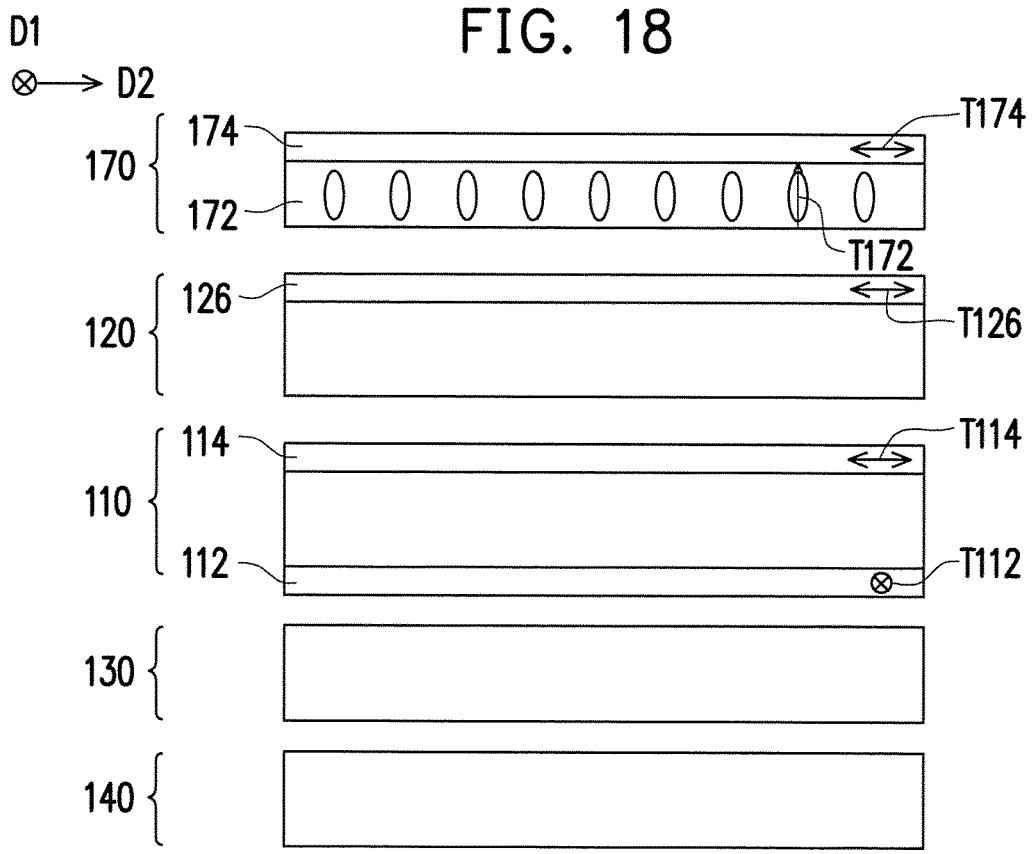

Referring to FIG. 11 and FIG. 19, a viewing angle switchable display apparatus 100J illustrated in FIG. 19 is similar to the viewing angle switchable display apparatus 100B illustrated in FIG. 11, and the main difference therebetween will be described as follows. In the viewing angle switchable display apparatus 100J illustrated in FIG. 19, the transmission axis T112 of the lower polarizer 112 of the display panel 110 is parallel to the first direction D1, and the transmission axis T114 of the upper polarizer 114 of the display panel 110, the transmission axis T126 of the first polarizer 126 and the transmission axis T174 of the second polarizer 174 are parallel to the second direction D2. Additionally, the phase retardation film 172 is an O-plate, where the optical axis T172 of the phase retardation film 172 is inclined relatively to the first direction D1. Namely, the optical axis T172 of the phase retardation film 172 is neither perpendicular nor parallel to the first direction D1. Additionally, an orthogonal projection of the optical axis T172 of the phase retardation film 172 on the second polarizer 174 is perpendicular to the second direction D2 (i.e., the anti-peep direction).

It should be supplementarily noted that although the aforementioned modifications of the embodiment are made based on the architecture illustrated in FIG. 11, the modifications (including replacing the C-plate with the O-plate and changing the directions of the transmission axes of the plurality of film layers) may also be applicable to the embodiments illustrated in FIG. 12 to FIG. 18.

Figure 20:
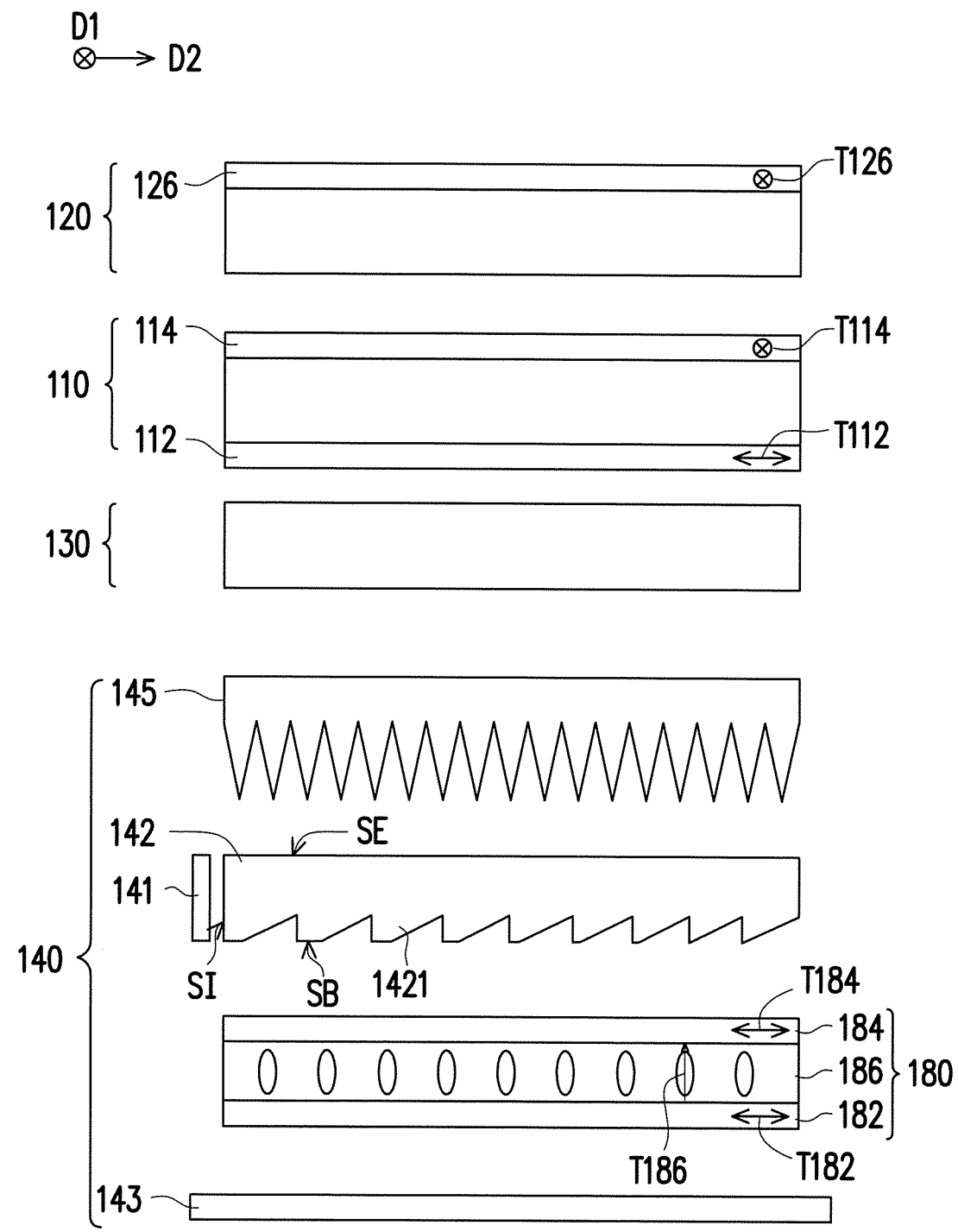

Referring to FIG. 1 and FIG. 20, a viewing angle switchable display apparatus 100K illustrated in FIG. 20 is similar to the viewing angle switchable display apparatus 100 illustrated in FIG. 1, and the main difference therebetween will be described as follows. In the viewing angle switchable display apparatus 100K, the filter sheet 144 depicted in FIG. 7 is replaced by a polarized viewing angle control element 180. The polarized viewing angle control element 180 is located between the light guide plate 142 and the reflection sheet 143 and includes third polarizers 182 and 184 and a phase retardation film 186 located between the third polarizers 182 and 184.

Each of the third polarizers 182 and 184 may be an absorptive polarizer or a reflective polarizer, and a transmission axis T182 of the third polarizer 182 and a transmission axis T184 of the third polarizer 184 are respectively parallel to the transmission axis T112 of the lower polarizer 112 of the display panel 110. For instance, both of the third polarizers 182 and 184 may be absorptive polarizers. Alternatively, the third polarizer 182 may be an absorptive polarizer, and the third polarizer 184 may be a reflective polarizer.

The phase retardation film 186 may be an O-plate or a C-plate. In other words, an optical axis T186 of the phase retardation film 186 may be perpendicular to the third polarizer 182. Alternatively, the optical axis T186 of the phase retardation film 186 may be inclined relatively to the first direction D1, and an orthogonal projection of the optical axis T186 of the phase retardation film 186 on the third polarizer 182 is perpendicular to the second direction D2 (i.e., the anti-peep direction).

A polarized viewing angle control element 180 is adapted to filter light beams at angles ranging from 60 degrees to 80 degrees, and may prevent leakage of large-viewing-angle light resulted from the light beams reflected back to the light guide plate 142 by the reflection sheet 143 and scattered by the micro-structures 1421 of the light guide plate 142, so as to enhance the anti-peep effect.

It should be supplementarily noted that although the aforementioned modification of the embodiment is made based on the architecture illustrated in FIG. 1, the modification (i.e., replacing the filter sheet 144 illustrated in FIG. 7 with the polarized viewing angle control element 180) may also be applicable to other embodiments.

Figure 21:
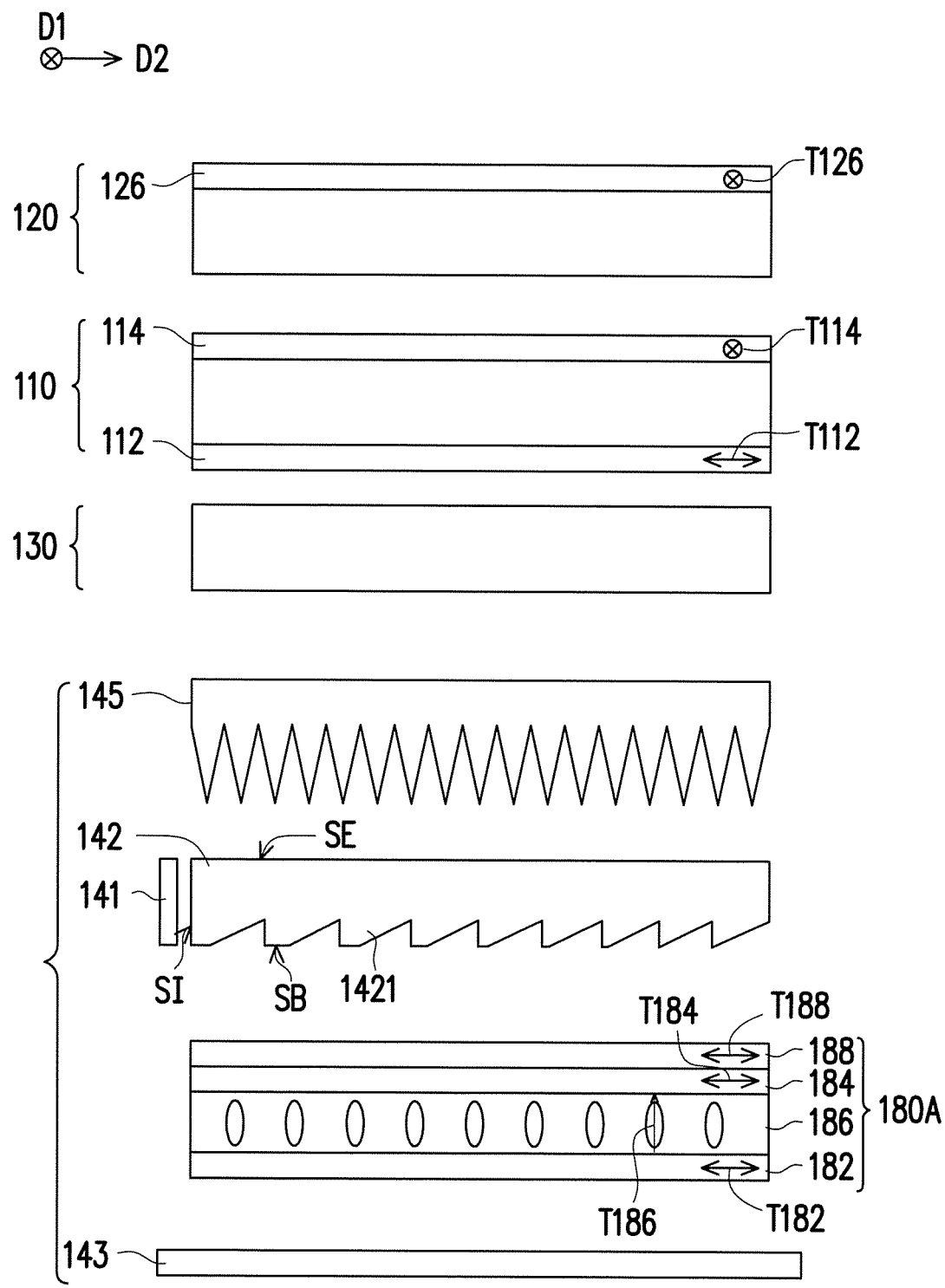

Referring to FIG. 20 and FIG. 21, a viewing angle switchable display apparatus 100L illustrated in FIG. 21 is similar to the viewing angle switchable display apparatus 100K illustrated in FIG. 20, and the main difference therebetween will be described as follows. In the viewing angle switchable display apparatus 100L illustrated in FIG. 21, the third polarizers 182 and 184 of a polarized viewing angle control element 180A are respectively absorptive polarizers, and the polarized viewing angle control element 180A further includes a reflective polarizer 188. The reflective polarizer 188 is located on a side of the polarized viewing angle control element 180A which is adjacent to the light guide plate 142. Particularly, the reflective polarizer 188 is, for example, disposed on the third polarizer 184, and the third polarizer 184 is located between the reflective polarizer 188 and the phase retardation film 186. A transmission axis T188 of the reflective polarizer 188 is parallel to the transmission axis T182 of the third polarizer 182 and the transmission axis T184 of the third polarizer 184. Thereby, the brightness of the display panel 110 may be increased.

In light of the foregoing, the embodiments of the invention achieve at least one of the following advantages or effects. In the viewing angle switchable display apparatus of the invention, the electrically controlled viewing angle switching device can be switched between the anti-peep mode and the share mode, and the electrically controlled light scattering switching device can be switched between the transparent state and the scattering state. When the electrically controlled viewing angle switching device is switched to the anti-peep mode, the electrically controlled light scattering switching device is correspondingly switched to the transparent state, such that the light beams, when passing through the electrically controlled light scattering switching device, can be prevented from being scattered, and the wide-angle light beams in the anti-peep direction are absorbed when the light beams pass through the electrically controlled viewing angle switching device. Thereby, the viewer viewing the viewing angle switchable display apparatus in a wide viewing angle can be prevented from seeing a displayed image, so as to achieve the anti-peep effect. When the electrically controlled viewing angle switching device is switched to the share mode, the electrically controlled light scattering switching device is correspondingly switched to the scattering state, such that the light beams, when passing through the electrically controlled light scattering switching device, are scattered, which contributes to enlarging the viewing angle, and the intensity ratios of the wide-angle light beams in the anti-peep direction are substantially uninfluenced when the light beams pass through the electrically controlled viewing angle switching device. Thus, the viewer viewing the viewing angle switchable display apparatus in the wide angle can see the displayed image, so as to achieve an image (information) sharing effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A viewing angle switchable display apparatus, comprising:
   a display panel, comprising a lower polarizer and an upper polarizer;
   an electrically controlled viewing angle switching device, opposite to the display panel and comprising two first transparent substrates, two first transparent conductive layers located between the two first transparent substrates, a liquid crystal layer located between the two first transparent conductive layers and a first polarizer located on a side of the electrically controlled viewing angle switching device which is far away from the display panel, wherein the liquid crystal layer comprises a plurality of liquid crystal molecules, and when the electrically controlled viewing angle switching device is turned off, optical axes of the liquid crystal molecules are parallel or perpendicular to a transmission axis of the first polarizer;

an electrically controlled light scattering switching device, comprising two second transparent substrates, two second transparent conductive layers located between the two second transparent substrates and an electronically controlled polymer material layer located between the two second transparent conductive layers; and a backlight module, comprising a light guide plate, a reflection sheet and a filter sheet, wherein the electrically controlled light scattering switching device is located between the display panel and the backlight module, the filter sheet is located between the light guide plate and the reflection sheet, and the filter sheet is adapted to reduce a brightness of light beams reflected back to the light guide plate by the reflection sheet.

2. The viewing angle switchable display apparatus according to claim 1, wherein the display panel is located between the electrically controlled viewing angle switching device and the electrically controlled light scattering switching device.

3. The viewing angle switchable display apparatus according to claim 2, wherein one of the two first transparent substrates which is far away from the display panel is a reinforced glass substrate.

4. The viewing angle switchable display apparatus according to claim 2, further comprising:

a touch sensing element, located between the first polarizer and one of the two first transparent substrates which is far away from the display panel; and a decoration layer, located on the electrically controlled viewing angle switching device, wherein the first polarizer is located between the decoration layer and the touch sensing element.

5. The viewing angle switchable display apparatus according to claim 2, further comprising:

a touch sensing element, located on the first polarizer; and a decoration layer, located on the touch sensing element, wherein the touch sensing element is located between the decoration layer and the first polarizer.

6. The viewing angle switchable display apparatus according to claim 1, wherein the electrically controlled viewing angle switching device is located between the display panel and the electrically controlled light scattering switching device.

7. The viewing angle switchable display apparatus according to claim 1, wherein the electronically controlled polymer material layer comprises polymer dispersed liquid crystal, polymer network liquid crystal or a composition containing dual frequency liquid crystal and reactive mesogen.

8. The viewing angle switchable display apparatus according to claim 1, wherein the backlight module further comprises a light source and a reverse prism film, the light source is located at a side of the light guide plate, and the light guide plate is located between the reverse prism film and the reflection sheet.

9. The viewing angle switchable display apparatus according to claim 8, wherein the filter sheet is a translucent film containing a light absorbing material, an absorptive polarizer or a composite polarizer composed of an absorptive polarizer and a reflective polarizer.

10. The viewing angle switchable display apparatus according to claim 1, further comprising:

a polarized viewing angle control element, located above the backlight module and comprising a phase retardation film and a second polarizer, wherein the second polarizer is disposed on a side of the phase retardation film which is far away from the display panel.

11. The viewing angle switchable display apparatus according to claim 10, wherein the phase retardation film is an O-plate, a C-plate or a composite plate composed of an O-plate and a C-plate.

12. The viewing angle switchable display apparatus according to claim 1, further comprising:

a polarized viewing angle control element, located between a light guide plate and a reflection sheet, wherein the polarized viewing angle control element comprises two third polarizers and a phase retardation film located between the two third polarizers.

13. The viewing angle switchable display apparatus according to claim 12, wherein each of the two third polarizers is an absorptive polarizer or a reflective polarizer, and the phase retardation film is an O-plate or a C-plate.

14. The viewing angle switchable display apparatus according to claim 12, wherein each of the two third polarizers is an absorptive polarizer, the phase retardation film is an O-plate or a C-plate, and the polarized viewing angle control element further comprises a reflective polarizer located on a side of the polarized viewing angle control element which is adjacent to the light guide plate.

* * * * *